US010639640B2

(12) United States Patent
Nahtigal

(10) Patent No.: US 10,639,640 B2
(45) Date of Patent: May 5, 2020

(54) APPARATUS AND METHODS FOR THE COMMINUTION OF BOTANICAL FEEDSTOCK

(71) Applicant: MedReleaf Corp., Markham (CA)

(72) Inventor: Istok Gorazd Nahtigal, Odessa (CA)

(73) Assignee: MedReleaf Corp., Markham, Ontario (CA)

( * ) Notice: Subject to any disclaimer, the term of this patent is extended or adjusted under 35 U.S.C. 154(b) by 353 days.

(21) Appl. No.: 15/791,183

(22) Filed: Oct. 23, 2017

(65) Prior Publication Data

US 2019/0118187 A1 Apr. 25, 2019

(51) Int. Cl.

| | |
|---|---|
| ***B02C 18/18*** | (2006.01) |
| ***B02C 18/10*** | (2006.01) |
| ***B02C 18/22*** | (2006.01) |
| ***B02C 23/10*** | (2006.01) |
| ***B02C 23/14*** | (2006.01) |
| ***B02C 23/16*** | (2006.01) |

(Continued)

(52) U.S. Cl.

CPC ............... *B02C 18/18* (2013.01); *A47J 43/00* (2013.01); *B02C 18/10* (2013.01); *B02C 18/2216* (2013.01); *B02C 23/10* (2013.01); *B02C 23/14* (2013.01); *B02C 23/16* (2013.01); *B26D 3/00* (2013.01); *B02C 2023/165* (2013.01)

(58) Field of Classification Search

CPC ..... B02C 18/18; B02C 18/10; B02C 18/2216; B02C 2023/165; B02C 23/10

USPC .................................................. 241/60, 79.1

See application file for complete search history.

(56) References Cited

U.S. PATENT DOCUMENTS 2,186,716 A * 1/1940 Dieckmann ........... B02C 18/362 241/292.1
2,259,623 A * 10/1941 Dieckmann ........... B02C 18/362 241/292.1

(Continued)

FOREIGN PATENT DOCUMENTS

CN 104353528 A 2/2015
CN 104826708 A 8/2015

(Continued)

OTHER PUBLICATIONS

TotalPatent: English machine translation of the Abstract, taken from CN104858029, published on Aug. 26, 2015.

(Continued)

*Primary Examiner* — Faye Francis
(74) *Attorney, Agent, or Firm* — Philip C. Mendes da Costa; Bereskin & Parr LLP/S.E.N.C.R.L. s.r.l.

(57) ABSTRACT

An apparatus for the comminution of a botanical feedstock includes a vessel, a screen positioned in the vessel above a first feedstock outlet and spaced from the top of the vessel, and a blade rotatably mounted above and generally parallel to the screen. The blade has a leading side, a trailing side, and a radial blade length. At least a portion of the leading side has a cutting edge and at least a portion of the trailing side has a downwardly extending trailing portion. The downwardly extending trailing portion has a lower edge having a plurality of discontinuities along a radial length of the trailing portion. The cutting edge is spaced from the upper surface of the screen by a first distance and a lowermost portion of the lower edge is spaced from the upper surface of the screen by a second distance.

8 Claims, 12 Drawing Sheets

(51) Int. Cl.
*A47J 43/00* (2006.01)
*B26D 3/00* (2006.01)

(56) References Cited

U.S. PATENT DOCUMENTS

| | | | | | |
|---|---|---|---|---|---|
| 2,825,377 | A | | 3/1958 | Ostrowski | |
| 3,608,838 | A | | 9/1971 | Lundin et al. | |
| 4,061,274 | A | * | 12/1977 | Williams | B02C 21/00 241/19 |
| 4,226,371 | A | * | 10/1980 | Willams | B02C 21/00 241/31 |
| 4,331,300 | A | * | 5/1982 | Hicks | A47J 43/0722 241/282.1 |
| 4,498,633 | A | * | 2/1985 | Williams | B02C 23/34 241/48 |
| 4,773,601 | A | | 9/1988 | Urich et al. | |
| 5,042,730 | A | * | 8/1991 | Hundt | B02C 18/143 144/176 |
| 5,381,970 | A | | 1/1995 | Bold et al. | |
| 5,707,017 | A | | 1/1998 | Paolucci et al. | |
| 5,794,864 | A | | 8/1998 | Hammett et al. | |
| 5,839,673 | A | * | 11/1998 | Williams | B02C 21/00 241/48 |
| 6,029,917 | A | * | 2/2000 | Jensen | B02C 18/362 241/27 |
| 6,550,702 | B2 | | 4/2003 | Champlin | |
| 7,624,936 | B2 | * | 12/2009 | Montag | B02C 23/12 241/18 |
| 9,763,543 | B2 | | 9/2017 | Wang et al. | |
| 9,815,225 | B2 | * | 11/2017 | Valdmaa | B02C 18/18 |
| 2006/0277714 | A1 | | 12/2006 | Dunning et al. | |
| 2007/0069056 | A1 | | 3/2007 | Shouse et al. | |
| 2017/0304839 | A1 | | 10/2017 | Miller et al. | |

FOREIGN PATENT DOCUMENTS

| | | | |
|---|---|---|---|
| CN | 104858029 | A | 8/2015 |
| EP | 2281634 | A1 | 2/2011 |
| WO | 2013188865 | A1 | 12/2013 |

OTHER PUBLICATIONS

TotalPatent: English machine translation of the Abstract, taken from CN104826708, published on Aug. 12, 2015.

TotalPatent: English machine translation of the Abstract, taken from CN104353528, published on Feb. 18, 2015.

TotalPatent: English machine translation of the Abstract, taken from EP2281634, published on Feb. 9, 2011.

International Search Report and Written Opinion, received in connection to international patent application No. PCT/CA2018/050972, dated Nov. 9, 2018.

* cited by examiner

APPARATUS AND METHODS FOR THE COMMINUTION OF BOTANICAL FEEDSTOCK

FIELD

This disclosure relates generally to apparatus and methods for the comminution of botanical feedstock. More specifically, this disclosure relates to apparatus and methods for the comminution of cannabis and the collection and/or separation of comminuted cannabis.

INTRODUCTION

The following is not an admission that anything discussed below is part of the prior art or part of the common general knowledge of a person skilled in the art.

Blade grinders are typically used to chop and mix a material using a relatively high speed rotating blade. Typically, with a blade grinder (or other similar chopping methods), the particles get smaller and smaller during the grinding process, which may make it difficult to achieve a consistent grind from batch to batch. In addition, may grinders operate on a batch basis as opposed to a continuous basis.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, an apparatus for the comminution of a botanical feedstock, such as cannabis, includes a screen positioned in a vessel and a rotating blade positioned above the screen. For example, the screen may be oriented generally horizontally (e.g., ±15° from the horizontal) and the rotating blade may be on a shaft that is oriented perpendicularly to the screen. A cutting edge of a leading side of the blade is spaced from the screen by a first distance. Accordingly, pieces of botanical feedstock resting on the screen that are large enough to extend upwardly from the screen by a distance greater than the first distance will be cut by the blade as it rotates above the screen.

The blade also has a downwardly extending trailing portion. This trailing portion has a lower edge having a plurality of discontinuities along its radial length. An advantage of this design is that, as the blade is rotated at relatively high speeds, air turbulence generated by these discontinuities may aerodynamically lift some or all of the pieces of botanical feedstock resting on the screen to a position above the screen, where they may then be cut by the cutting edge of the blade as it rotates above the screen. Additionally, or alternatively, the air turbulence generated by the downwardly extending trailing portion may aerodynamically suspend some pieces of botanical feedstock in a position above the screen, where they may then be cut by the cutting edge of the blade.

By providing a rotating blade with such a downwardly extending trailing portion, the apparatus may be more efficient at reducing the size of the botanical feedstock pieces before they pass through openings in the screen. Additionally, or alternatively, the apparatus may provide a more consistent size of cut botanical feedstock pieces that pass through openings in the screen. Improving the consistency of the size of cut botanical feedstock (e.g. cut cannabis particles) may advantageously improve further processing of the botanical feedstock. For example, a more consistent cut particle size may increase the packing density of the cut particles, which may improve throughput of subsequent processing of the feedstock (e.g. an extraction process to obtain a cannabis extract from cut cannabis feedstock).

Another potential advantage of this design is that the rotating blade may be spaced from the screen during its rotation, which may reduce or minimize heat generated by friction. For certain botanical feedstocks, e.g. cannabis, it may be desirable to reduce the size of feedstock pieces without unnecessarily heating the feedstock (e.g. by crushing or shearing), as such heating may degrade or otherwise alter the chemical structure of one or more components or compounds in the feedstock (e.g. trichomes, terpenes).

In accordance with this broad aspect, there is provided an apparatus for the comminution of a botanical feedstock, the apparatus comprising:

(i) a vessel having a top and a bottom, the bottom comprising a first feedstock outlet;

(ii) a screen positioned in the vessel above the first feedstock outlet and spaced from the top of the vessel, the screen having an upper surface and a lower surface; and, (iii) a blade rotatably mounted above and generally parallel to the screen and configured to be rotated in a direction of rotation, the blade having a leading side, a trailing side in the direction of rotation and a radial blade length between an axis of rotation and a blade tip, at least a portion of the leading side having a cutting edge and at least a portion of the trailing side having a downwardly extending trailing portion, the downwardly extending trailing portion having a lower edge having a plurality of discontinuities along a radial length of the trailing portion, wherein the cutting edge is spaced from the upper surface of the screen by a first distance and a lowermost portion of the lower edge is spaced from the upper surface of the screen by a second distance.

In some embodiments, the plurality of discontinuities may comprise radially spaced apart downwardly extending sections of the lower edge, each section having a top and a bottom, wherein the radial extent of each section may narrow towards the bottom of the section and a gap between adjacent sections may increase towards the bottom.

In some embodiments, the lower edge may be generally saw toothed in shape.

In some embodiments, the lower edge may be generally sinusoidal in shape.

In some embodiments, the first distance may be from 31 mm to 54 mm.

In some embodiments, the second distance may be from 7 mm to 30 mm.

In some embodiments, the screen may have an aperture size of between 2 mm and 15 mm.

In some embodiments, the vessel may define a volume overlying the blades and the volume may be uninterrupted.

In some embodiments, the apparatus may further comprise a feedstock inlet in communication with the vessel and comprising an openable feed port.

In some embodiments, first feedstock outlet may be connectable in fluid communication with a source of negative pressure.

In some embodiments, the blade may have a rate of rotation and at the rate of rotation, the downwardly extending trailing portion may be operable to draw at least some feedstock positioned on the upper surface of the screen from the upper surface of the screen towards a plane of rotation of the cutting edge.

In some embodiments, the downwardly extending trailing portion may extend at an angle of between 30 degrees and 60 degrees to the plane of rotation.

In some embodiments, the apparatus may further comprise a cyclonic separator positioned downstream from the first feedstock outlet, the cyclonic separator being in flow communication with a separated material collection region and a fluid outlet.

In some embodiments, the apparatus may further comprise a filter positioned downstream from the fluid outlet.

In some embodiments, the blade may comprise a plurality of blades.

In accordance with another aspect of this disclosure, which may be used alone or in combination with any other aspect, a method of grinding a botanical feedstock, such as cannabis, comprises rotating one or more cutting blades wherein the one or more curring blades are configured to produce lift or turbulence to raise uncut or partially cut feedstock into a zone in which they may be cut by the blade or blades. In one embodiment, the grinding apparatus is operated under negative pressure which may produce a downwardly flow of air and feedstock and accordingly, in such a case, the lift may be sufficient to overcome the downward force and raise uncut or partially cut feedstock into a zone in which they may be cut by the blade or blades. In accordance with this aspect, an apparatus for the comminution of a botanical feedstock, such as cannabis, may include a vessel having a feedstock outlet in fluid communication with a source of negative pressure, a screen positioned in the vessel above the outlet, and a rotatable blade positioned above the screen. The blade has a downwardly extending trailing portion. This trailing portion has a lower edge having a plurality of discontinuities along its radial length. A method for operating such an apparatus includes rotating the blade at a rate of rotation sufficient for the trailing portion of the blade to generate an upward force such as by turbulence that induces upward movement of cut and partially cut feedstock resting on the screen despite a downward force produced by the negative pressure.

An advantage of this method is that, as the blade is rotated, air turbulence generated by the trailing portion of the blade may aerodynamically lift and/or suspend some or all of the pieces of botanical feedstock resting on the screen to a position above the screen, where they may then be cut by the cutting edge of the blade as it rotates above the screen.

Optionally, the source of negative pressure may be activated to reduce the pressure in the vessel to below ambient pressure, and draw botanical feedstock (including pieces of cut and partially cut feedstock) towards the feedstock outlet. Preferably, at the rate of rotation, the turbulence generated by the blade may overcome a downward force on the pieces of cut and partially cut feedstock produced by the source of negative pressure.

Another potential advantage of this method is that pieces of cut and partially cut feedstock (including 'dust' and other fine particles) may be drawn through the screen and through the feedstock outlet by the source of negative pressure. Optionally, cut feedstock drawn through the feedstock outlet may be subjected to separation (e.g. cyclonic separation wherein the source of negative pressure is downstream from the cyclone air outlet) and/or filtration and subsequent collection. This may reduce or minimize any loss of fine particulate matter (e.g. trichomes) which may be regarded as valuable.

In accordance with this broad aspect, there is provided a method of operating an apparatus for the comminution of a botanical feedstock, wherein the apparatus comprises:

(i) a vessel having a top and a bottom, the bottom comprising a first feedstock outlet connected in fluid communication with a source of negative pressure;

(ii) a screen positioned in the vessel above the first feedstock outlet and spaced from the top of the vessel, the screen having an upper surface and a lower surface; and, (iii) a blade rotatably mounted above and generally parallel to the screen and configured to be rotated in a direction of rotation, the blade having a leading side, a trailing side in the direction of rotation and a radial blade length between an axis of rotation and a blade tip, at least a portion of the leading side having a cutting edge and at least a portion of the trailing side having a downwardly extending trailing portion, the downwardly extending trailing portion having a lower edge having a plurality of discontinuities along a radial length of the trailing portion;

the method comprising:

rotating the blade in the direction of rotation at a rate of rotation, wherein the trailing portion generates turbulence that induces upward movement of cut and partially cut feedstock from the upper surface of the screen to a plane of rotation of the cutting edge of the blade.

In some embodiments, the method may further comprise activating the source of negative pressure to reduce the pressure in the vessel to below ambient pressure, wherein at the rate of rotation, the turbulence generated by the rotation of the blade may overcome a downward force on the cut and partially cut feedstock that is produced by the source of negative pressure.

In some embodiments, at the rate of rotation, the plurality of discontinuities may produce eddy currents that draw cut and partially cut feedstock upwardly to a plane of rotation of the cutting edge of the blade.

In some embodiments, at the rate of rotation, the rotation of the blade may neutralize a downward force on the cut and partially cut feedstock that is produced by the negative pressure in the vessel and may provide lift to the cut and partially cut feedstock.

In some embodiments, the lower edge of the downwardly extending trailing portion may be generally saw toothed in shape and at the rate of rotation, the rotation of the blade may provide lift to the cut and partially cut feedstock.

In some embodiments, the rate of rotation may be between 750 and 1400 revolutions per minute.

In some embodiments, the vessel may define a volume positioned above the blade and the negative pressure may draw fine particulate matter from the volume and through the screen.

In some embodiments, the negative pressure may draw at least 75% of the fine particulate matter from the volume and through the screen.

In some embodiments, the method may further comprise withdrawing cut feedstock from the first feedstock outlet and conveying the treated feedstock to a cyclonic separator.

In some embodiments, the method may further comprise subjecting a fluid stream drawn from the vessel through the first feedstock outlet to cyclonic separation thereby separating some of the cut feedstock from the fluid stream and collecting the separated feedstock in a separated material collection region.

In some embodiments, the method may further comprise obtaining a fluid steam having a reduced level of cut feedstock from the cyclonic separator and subjecting the fluid stream to physical filtration to remove fine particulate matter from the fluid steam having a reduced level of cut feedstock.

Typically, a batch grinder may be operated by loading the grinder with a botanical feedstock through a feed port, closing the feed port, operating the grinder with the feed port closed until the feedstock has been ground, and then deactivating the grinder prior to re-opening the feed port and introducing additional botanical feedstock to be ground. Grinding a feedstock in such 'batches' may have one or more disadvantages. For example, the grinder is idle (i.e. not grinding feedstock) while additional batches of feedstock are being loaded into the grinder, which may reduce overall throughput.

In accordance with another aspect of this disclosure, which may be used alone or in combination with any other aspect, a method of continuously operating a batch grinder is provided. First, botanical feedstock is loaded into a vessel of the grinder. The vessel is closed and the grinder is operated under negative pressure and a fluid stream containing treated feedstock is removed from the grinder. While continuing to draw air from the vessel, and while continuing to operate the grinder, a feed port of the vessel is opened and additional botanical feedstock is introduced into the grinder.

An advantage of this method is that, by continuing to draw air from the vessel, pieces of feedstock (including dust and other fine particulate) may be inhibited or prevented from exiting the vessel via the feed port of the vessel. Additionally, or alternatively, by loading additional feedstock into the grinder without stopping and restarting the grinder, overall throughput and the uniformity of the treated feedstock may be increased.

Another advantage is that, for cannabis, dust produced by the grinding process includes a fine dry resin that has been detached from the plant material, which is typically considered valuable. Further, government or health regulations may limit the amount of such material that may be in a work environment (e.g., parts per million). By operating the grinder under negative pressure, such dust may tend to be drawn away from a feed inlet in an upper portion of the vessel thereby enabling a feed inlet port to be opened during the grinding process and untreated feedstock to be introduced. Accordingly, the grinder may be operated on a continuous basis.

Another potential advantage of this method is that pieces of cut and partially cut feedstock (including 'dust' and other fine particles) may be withdrawn from the grinder using the source of negative pressure. Optionally, cut feedstock drawn through the feedstock outlet may be subjected to separation (e.g. cyclonic separation) and/or filtration and subsequent collection. This may reduce or minimize any loss of fine particulate matter (e.g. trichomes) which may be regarded as valuable.

In accordance with this broad aspect, there is provided a method of continuously operating a batch grinder comprising:

(a) introducing a botanical feedstock into a vessel of the grinder;

(b) closing the vessel and operating the grinder as a closed vessel under negative pressure and withdrawing a fluid steam containing treated feedstock from the grinder; and, (c) while continuing to operate the grinder under negative pressure, opening a feed port of the vessel and introducing additional botanical feedstock into the grinder while continuing to draw air from the vessel using a source of negative pressure.

In some embodiments, the grinder may comprise a rotating blade and the method may further comprise rotating the blade at a rate to counter a downward force applied to the feedstock in the grinder due to the negative pressure.

In some embodiments, the grinder may comprise a rotating blade having an eddy producing trailing edge and the method may further comprise rotating the blade to produce eddy currents to draw cut and partially cut feedstock upwardly from a screen to a level of a leading edge of the blade.

In some embodiments, the method may further comprise conveying the fluid steam containing the treated feedstock to a cyclonic separator.

In some embodiments, the method may further comprise subjecting the fluid stream containing the treated feedstock to cyclonic separation using a cyclonic separator thereby separating some of the treated feedstock from the fluid stream and collecting the separated treated feedstock in a separated material collection region.

In some embodiments, the method may further comprise obtaining a secondary fluid steam having a reduced level of treated feedstock from the cyclonic separator and subjecting the secondary fluid stream to physical filtration to remove fine particulate matter from the secondary fluid steam.

In accordance with another aspect of this disclosure, which may be used alone or in combination with any other aspect, an apparatus for the treatment of cannabis is provided. The apparatus includes a grinder having a feedstock outlet and a source of negative pressure downstream of the feedstock outlet. A cyclonic separator downstream of the feedstock outlet has an inlet for receiving comminuted cannabis from the grinder and a comminuted cannabis outlet.

An advantage of this design is that, as a cannabis feedstock is reduced to comminuted cannabis by the grinder, the comminuted cannabis may be withdrawn from the grinder entrained in an airflow and subsequently separated from the airflow using the cyclonic separator. This may increase the total volume of comminuted cannabis collected from the grinding process. For example, dust and other fine cannabis particles (including e.g. trichomes, terpenes) may be drawn from the grinder and collected following cyclonic separation. Such fine cannabis particles may escape to the atmosphere and/or otherwise be lost when processed in a typical 'batch' grinder (e.g. without a source of negative pressure and/or without a cyclonic separator).

In accordance with this broad aspect, there is provided an apparatus for the treatment of cannabis comprising:

(i) a grinder having a feedstock inlet and a feedstock outlet;

(ii) a first cyclonic separator positioned downstream from the feedstock outlet, the first cyclonic separator having a cyclone inlet receiving comminuted cannabis from the grinder, a comminuted cannabis outlet, and a cyclone air outlet; and, (iii) a source of negative pressure downstream from the feedstock outlet of the grinder.

In some embodiments, the source of negative pressure may be downstream from the cyclone air outlet.

In some embodiments, the apparatus may further comprise a first separated material collection chamber downstream from the comminuted cannabis outlet.

In some embodiments, the apparatus may further comprise an extractor having an inlet that receives at least some of the comminuted cannabis exiting the comminuted cannabis outlet, the extractor producing a cannabis extract.

In some embodiments, the apparatus may further comprise an extractor having an inlet that receives at least some of the comminuted cannabis from the separated material collection chamber, the extractor producing a cannabis extract.

In some embodiments, the grinder may further comprise:

(a) a screen positioned in a vessel above the feedstock outlet, the screen having an upper surface and a lower surface; and, (b) at least one blade rotatably mounted above the screen and rotatable in a direction of rotation, a first blade of the at least one blade having a leading edge comprising a cutting portion, wherein the cutting portion is spaced from the upper surface of the screen by a first distance.

In some embodiments, the at least one blade may have a trailing edge comprising a downwardly extending trailing portion, the downwardly extending trailing portion may have a lower edge having a plurality of discontinuities along a radial length of the trailing portion, wherein a lowermost portion of the lower edge may be spaced from the upper surface of the screen by a second distance.

In some embodiments, the first blade may have the trailing edge.

In some embodiments, the apparatus may further comprise a filtration member positioned downstream of the cyclone air outlet.

In some embodiments, the filtration member may comprise a second cyclonic separator.

In some embodiments, the filtration member may comprise a physical filtration member.

In accordance with another aspect of this disclosure, which may be used alone or in combination with any other aspect, a method of treating cannabis is provided. First, a feedstock of cannabis is treated to obtain comminuted cannabis. The treated feedstock is conveyed to a cyclonic separator to obtain a stream of treated feedstock and a fluid stream having a reduced level of treated feedstock.

An advantage of this method is that, by pneumatically conveying the comminuted cannabis to the cyclonic separator, any loss of fine particulate matter (e.g. trichomes) during transfer from the treatment stage to the cyclonic separation stage may be reduced or preferably minimized.

Another potential advantage of this method is that the fluid stream having a reduced level of treated feedstock may be subjected to further treatment (e.g. cyclonic separation or physical filtration) to increase the overall recovery of the comminuted cannabis, including in particular the recovery of fine particulate matter (e.g. trichomes).

Another potential advantage of this method is that comminuted cannabis obtained by cyclonic separation may be subjected to extraction to obtain a cannabis extract. Additionally, multiple cyclonic separation stages may be arranged in series and used to obtain treated cannabis feedstock with different average particle sizes.

In accordance with this broad aspect, there is provided a method for treating cannabis comprising:

(a) treating a feedstock of cannabis and obtaining treated feedstock comprising comminuted cannabis;

(b) pneumatically conveying the treated feedstock to a cyclonic separator; and, (c) subjecting the treated feedstock to a first cyclonic separation stage and obtaining a first stream of treated feedstock separated out of a fluid stream by the first cyclonic separation stage and a first fluid stream having a reduced level of treated feedstock.

In some embodiments, step (a) may comprise comminuting at least a portion of the feedstock of cannabis.

In some embodiments, the method may further comprise subjecting at least a portion of the first stream of treated feedstock to extraction and obtaining a cannabis extract.

In some embodiments, the method may further comprise collecting the first stream of treated feedstock exiting the cyclonic separator and subsequently subjecting at least a portion of the collected first stream of treated feedstock to extraction and obtaining a cannabis extract.

In some embodiments, step (c) may further comprise subjecting the treated feedstock to at least one subsequent cyclonic separation stage in series with the first cyclonic separation stage, wherein each subsequent cyclonic separation stage may separate treated cannabis having a smaller particle size than the immediately previous cyclonic separation stage.

In some embodiments, the method may further comprise subjecting the first fluid stream having a reduced level of treated feedstock to a second cyclonic separation stage and obtaining a second fluid stream having a further reduced level of treated feedstock and treated feedstock separated out of a fluid stream by the second cyclonic separation stage wherein the treated feedstock separated out of a fluid stream by the second cyclonic separation stage may have a smaller average particle size than an average particle size of the treated feedstock separated out of a fluid stream by the first cyclonic separation stage.

In some embodiments, the method may further comprise subjecting the first fluid stream having a reduced level of treated feedstock to a physical filtration stage.

In some embodiments, step (a) may comprise comminuting at least a portion of the feedstock of cannabis, and the method may further comprise collecting the first stream of treated feedstock exiting the cyclonic separator and subsequently subjecting at least a portion of the collected first stream of treated feedstock to extraction and obtaining a cannabis extract.

In some embodiments, the method may further comprise subjecting the first fluid stream having a reduced level of treated feedstock to a physical filtration stage.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
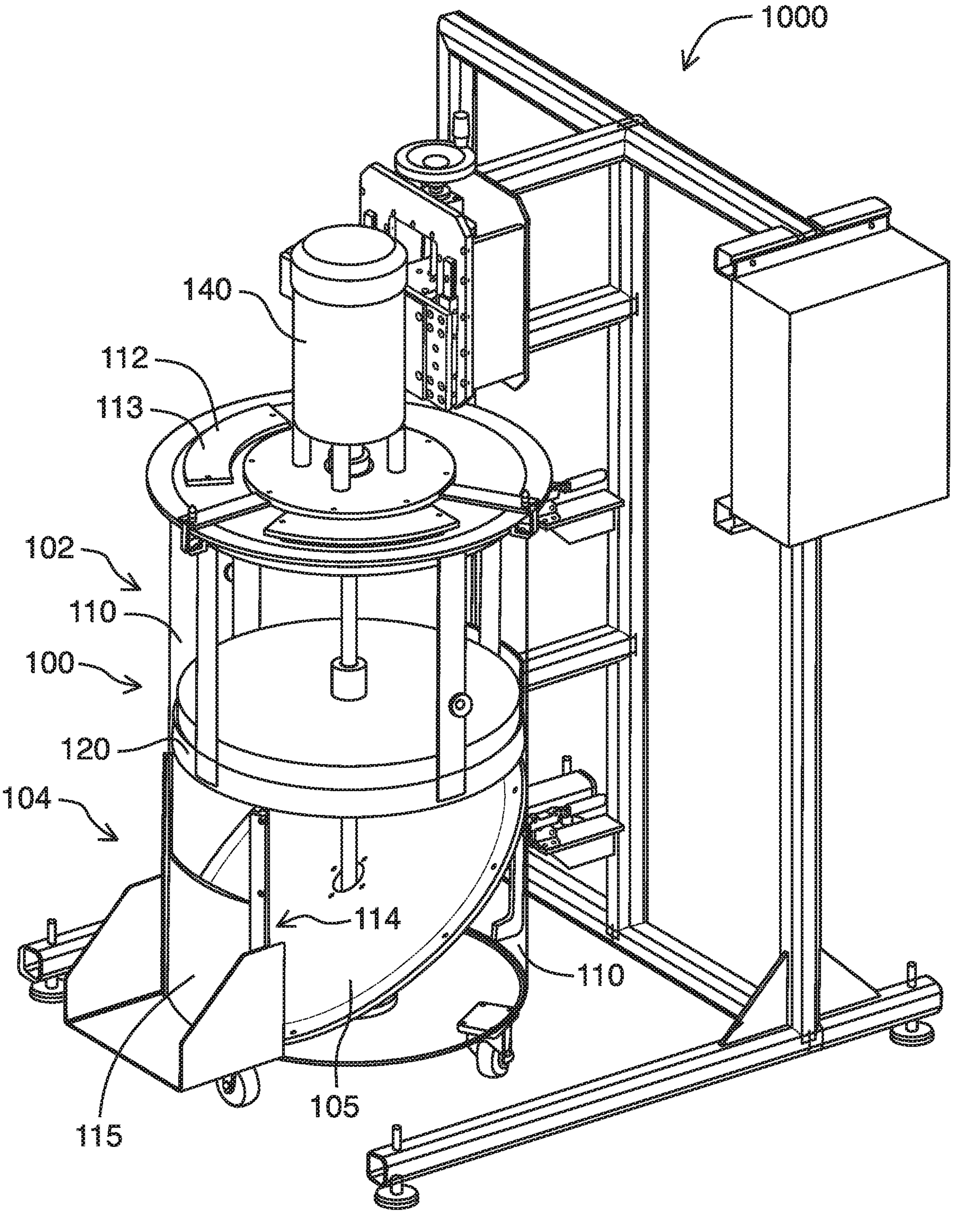
FIG. 1 is a perspective view of an apparatus for the comminution of a botanical feedstock in accordance with one embodiment, with portions of the vessel wall shown as translucent for ease of understanding.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of an Apparatus for Comminution of a Botanical Feedstock

Referring to FIGS. 1 to 8, an exemplary embodiment of an apparatus for comminution of a botanical feedstock is shown generally as 1000. The following is a general discussion of this embodiment which provides a basis for understanding several of the features which are discussed herein. As discussed subsequently, each of the features may be used individually or in any particular combination or sub-combination in this or in other embodiments disclosed herein.

In the illustrated embodiment, the apparatus breaks up a botanical feedstock (e.g. cannabis) into smaller pieces using one or more rotating cutting blades. The apparatus may also be characterized as a 'blade grinder' or simply as a 'grinder'.

As exemplified in FIGS. 1 to 6, apparatus 1000 includes a vessel 100 having an upper end 102, a lower end 104, and a screen 120 positioned in the vessel 100 between the upper end 102 and the lower end 104.

In the illustrated example, vessel 100 is generally cylindrical. Preferably, vessel 100 is generally round at the position of the screen 120 and blade 200 (discussed further below), although it may have any suitable shape. For example, vessel 100 may have a diameter of about 22 inches.

Screen 120 has an upper surface 122, a lower surface 124, and includes a plurality of holes or other apertures 125 extending through the screen from the upper surface 122 to the lower surface 124. Preferably, at least the majority of apertures 125 have the same or similar dimensions. Accordingly, particles of botanical material introduced into the vessel above the screen (e.g. via an inlet provided in the upper end 102) that are larger than the screen apertures will be retained by and remain above the screen, while particles of botanical material that are smaller than the apertures 125 are able to travel through the screen into the lower end 104 of vessel 100. Thus, the 'grind size' or average size of the particles of botanical feedstock that reach the lower end 104 of vessel 100 is based on the size of the screen apertures 125. Accordingly, the size of the screen apertures may be selected based on a desired 'grind size' for the comminuted botanical feedstock. In some embodiments, the screen 120 may be a 0.25 inch square mesh screen. In some embodiments, the screen may have a Tyler mesh size in the range spanning 7 to 2.5. Alternatively, mesh sizes with larger openings may be used depending on e.g. an intended use for the comminuted botanical feedstock.

In the illustrated example, two feedstock inlets 112 are provided at the upper end 102 of vessel 100. Each feedstock inlet 112 is openable to allow a botanical feedstock to be introduced into the upper end 102 of vessel 100. It will be appreciated that in alternative embodiments, a single feedstock inlet 112 may be provided, or three or more inlets 112 may be provided. Further, the inlets may be placed elsewhere (e.g., on an upper portion of the sidewall 110 of vessel 100).

In the illustrated example, a feedstock outlet 114 is provided in the lower end 104. It will be appreciated that in alternative embodiments, two or more feedstock outlets may be provided. Further, the one or more outlets may be located at any position below screen 120 and need not be in a lower portion of the sidewall of vessel 100. For example, an outlet may be provided in the lower surface of vessel 100.

Figure 12:
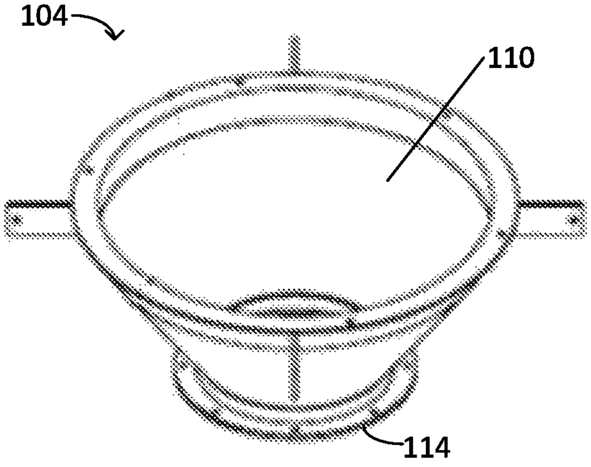
FIG. 12 is a top perspective view of a lower end of a vessel in accordance with another embodiment.
Figure 13:
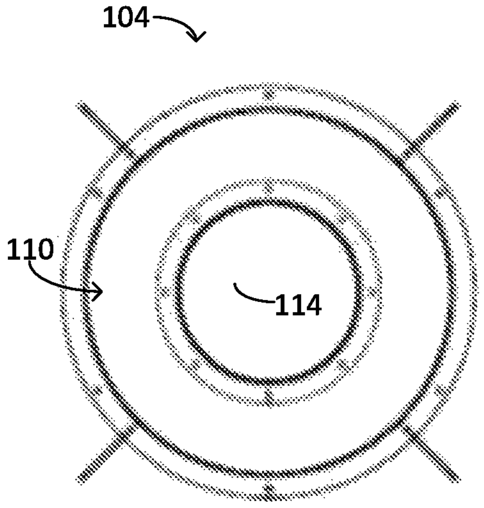
FIG. 13 is a top view of the lower end of a vessel of FIG. 12.
Figure 14:
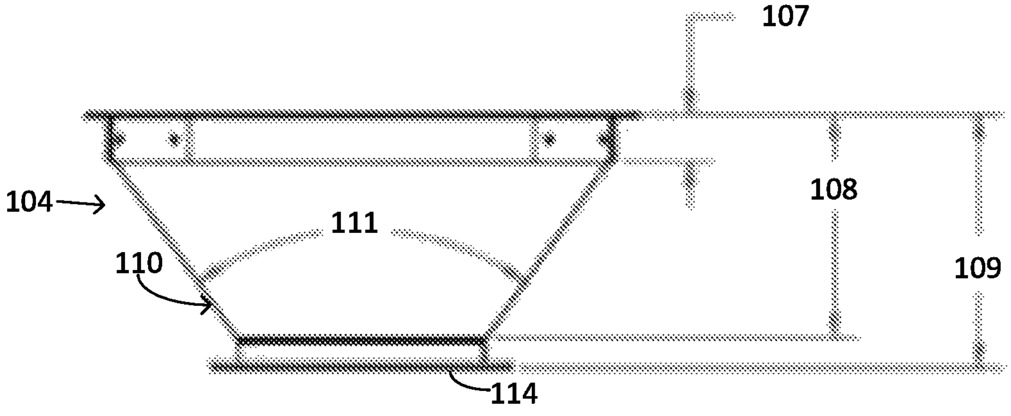
FIG. 14 is a side view of the lower end of a vessel of FIG. 12.

FIGS. 12 to 14 (and FIGS. 7 and 8) illustrate an example of a conical lower end 104 of vessel 100 in which the sidewall 110 tapers inwardly at an angle 111 towards a feedstock outlet 114. In the illustrated example, the angle 111 of the sidewall taper is about 70°, although it may be larger or smaller in alternative embodiments. Also, in the illustrated example the lower end 104 has an overall height 109 of about 11.4 inches, an upper portion 107 of about 2.1 inches that is not tapered, and a distance 108 of about 10.1 inches from the top of lower end 104 to the top of feedstock outlet 114. Upper portion 107 has an inner diameter of about 22 inches. It will be appreciated that other suitable designs and/or dimensions of lower end 104 may be used in alternative embodiments.

In example illustrated in FIG. 1, feedstock outlet 114 is provided with an optional openable door 115 to allow particles of comminuted feedstock to be removed from the lower end of the vessel at selected times (i.e., when the door 115 is opened). Also, in the illustrated example an optional deflector plate 105 is provided to direct comminuted feedstock towards feedstock outlet 114 and openable door 115. Deflector Plate 105 may be of any configuration which directs comminuted feedstock to door 115. Alternatively, a door may not be provided. For example, as discussed further below, feedstock outlet 114 may be an opening in the sidewall that is coupled to a conduit or otherwise in fluid communication with a source of negative pressure.

Apparatus 1000 also includes at least one blade 200 rotatably mounted above screen 120. As will be discussed further below, when blade 200 is rotated, botanical material in the path of a cutting edge of the blade will be cut by the blade, thereby reducing the particle size of the botanical material. As noted above, once botanical material has been reduced to a particle that is smaller than an aperture in the screen, that particle of comminuted material may travel through the screen into the lower end 104 of vessel 100.

In the illustrated example, blade 200 is coupled to a motor 140 via a drive shaft 150. In use, motor 140 rotates the drive shaft 150, thereby rotating the blade 200. In alternative embodiments, a gearbox or the like may be provided between the motor 140 and blade 200 to control e.g. the speed and/or torque of the blade during rotation. The motor is preferably positioned above the blade 200, as shown in the illustrated embodiment, although it may be positioned below the blade 200 in alternative embodiments.

As exemplified, vessel 100 is shown as being vertically oriented. Accordingly, as exemplified drive shaft 150 extends vertically or generally vertically. It will be appreciated that vessel may be oriented such that drive shaft 150 is at an angle (e.g., 5°, 10°, 15°, 20°) to the vertical. It will be appreciated that drive shaft 150 is preferably perpendicular or generally perpendicular to screen 120. Accordingly, as the blade rotates, it remains a relatively constant distance from the upper surface of screen 120.

Figure 2:
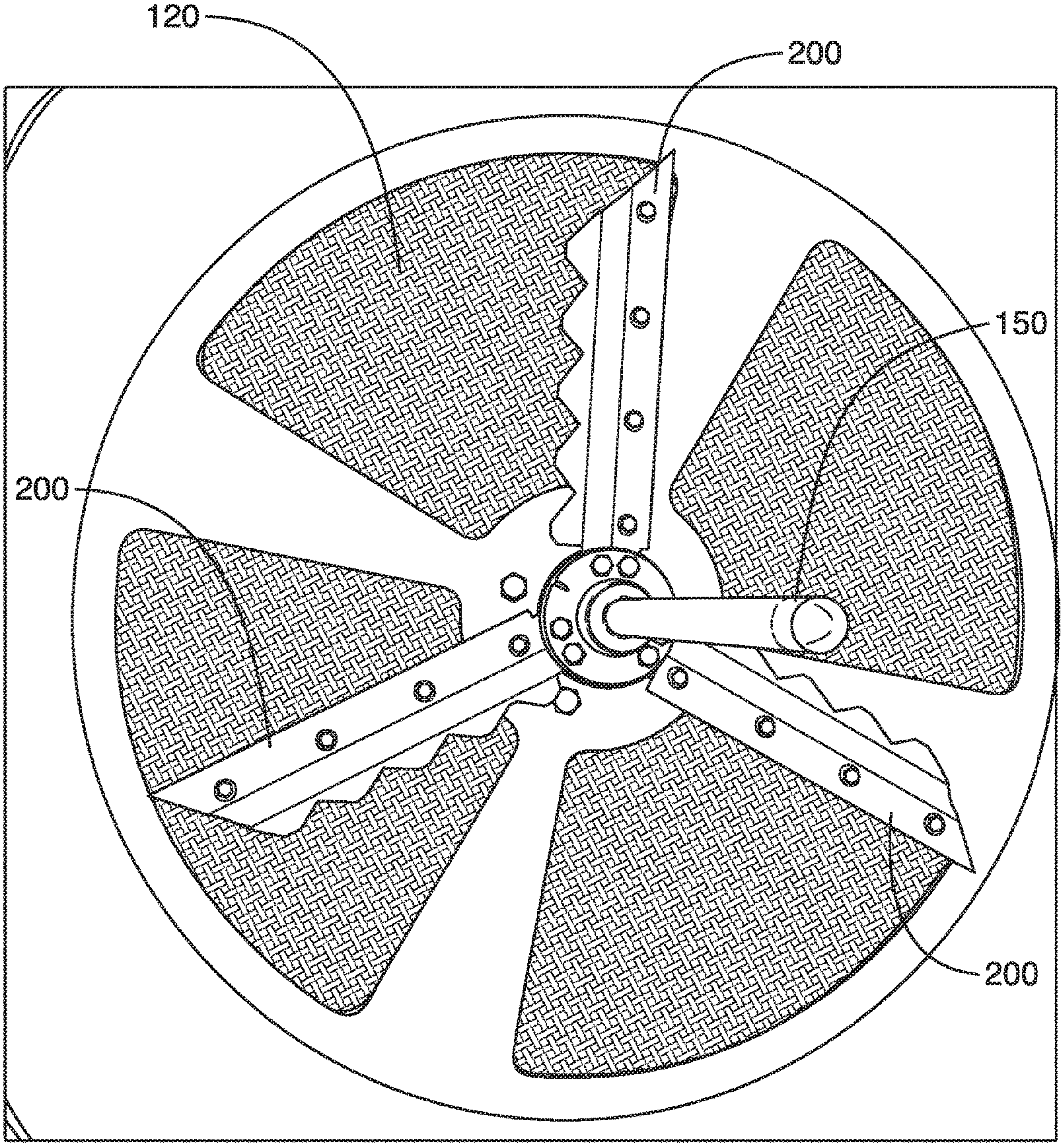
FIG. 2 is a top perspective view of the interior of the upper portion of the vessel of the apparatus of FIG. 1.
Figure 3:
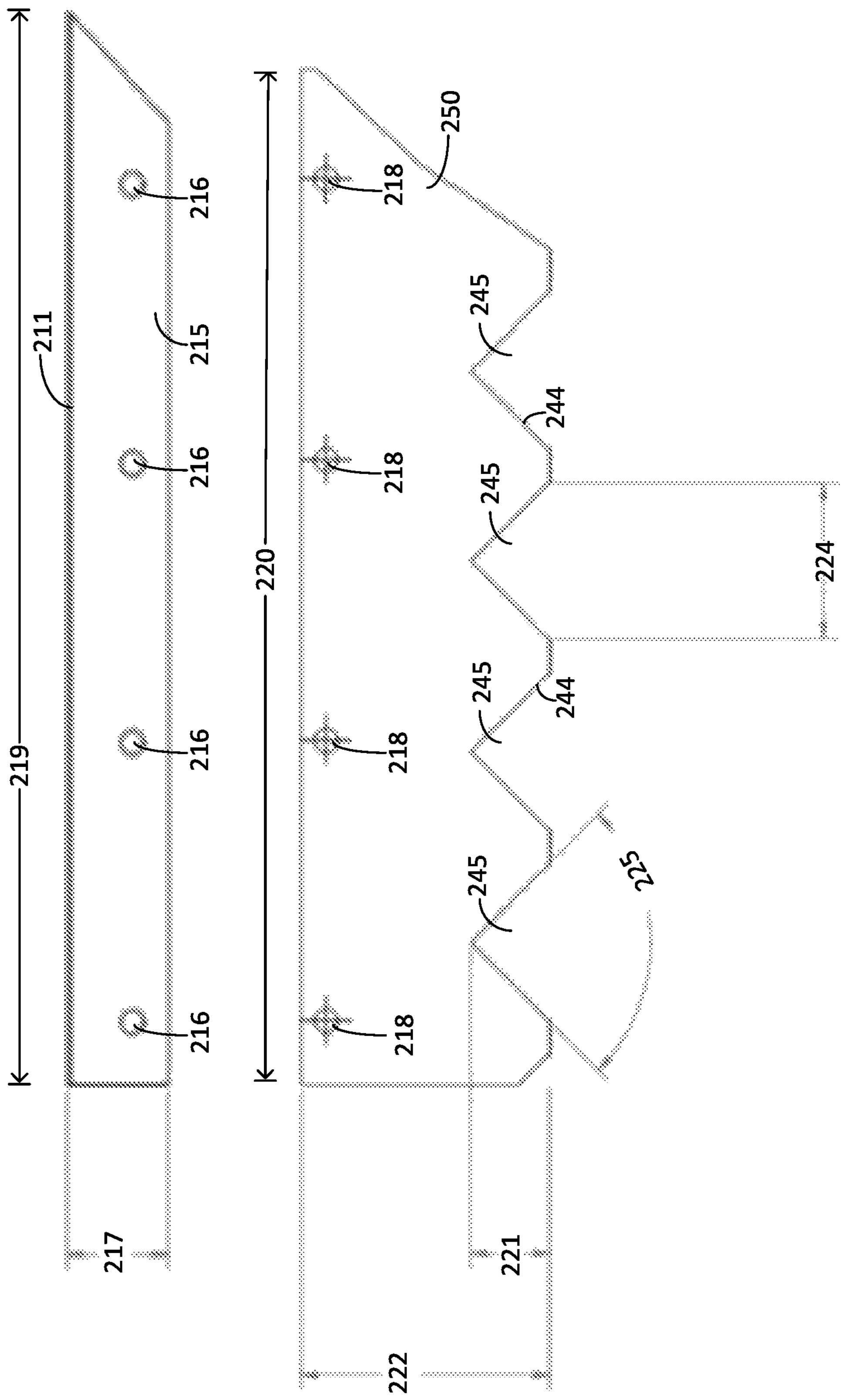
FIG. 3 is a top view of a cutting edge insert and a main blade body of a blade of the apparatus of FIG. 1 during manufacture, prior to bending the main blade body to create a downwardly extending trailing portion.

As exemplified in FIG. 2, three blades 200 may be provided for cutting botanical feedstock. In alternative embodiments, a single blade 200, two blades 200, or four or more blades 200 may be provided. The blades may be equally spaced around motor shaft 150. Therefore, if three blades 200 are provided, they may be spaced 120° around the motor shaft. In alternate embodiments, they need not be equally spaced apart.

Configuration of the Cutting Blades

The flowing is a description of the configuration of blades 200 which may be used by itself or in combination with one or more of the other features disclosed herein including having the feedstock outlet in communication with a source of negative pressure, the use of one or more cyclone separators and any of the methods disclosed herein.

In accordance with this aspect, blades 200 are configured to cut the feedstock and also to draw feedstock (which may or not have been cut) upwardly from the upper surface of screen 120 and into a zone in which it will be cut by blades 200. For example, blades 200 may be configured to entrain or 'sweep up' feedstock and direct the feedstock upwardly towards a plane of rotation of the cutting edge 210 of blade 200.

Figure 6:
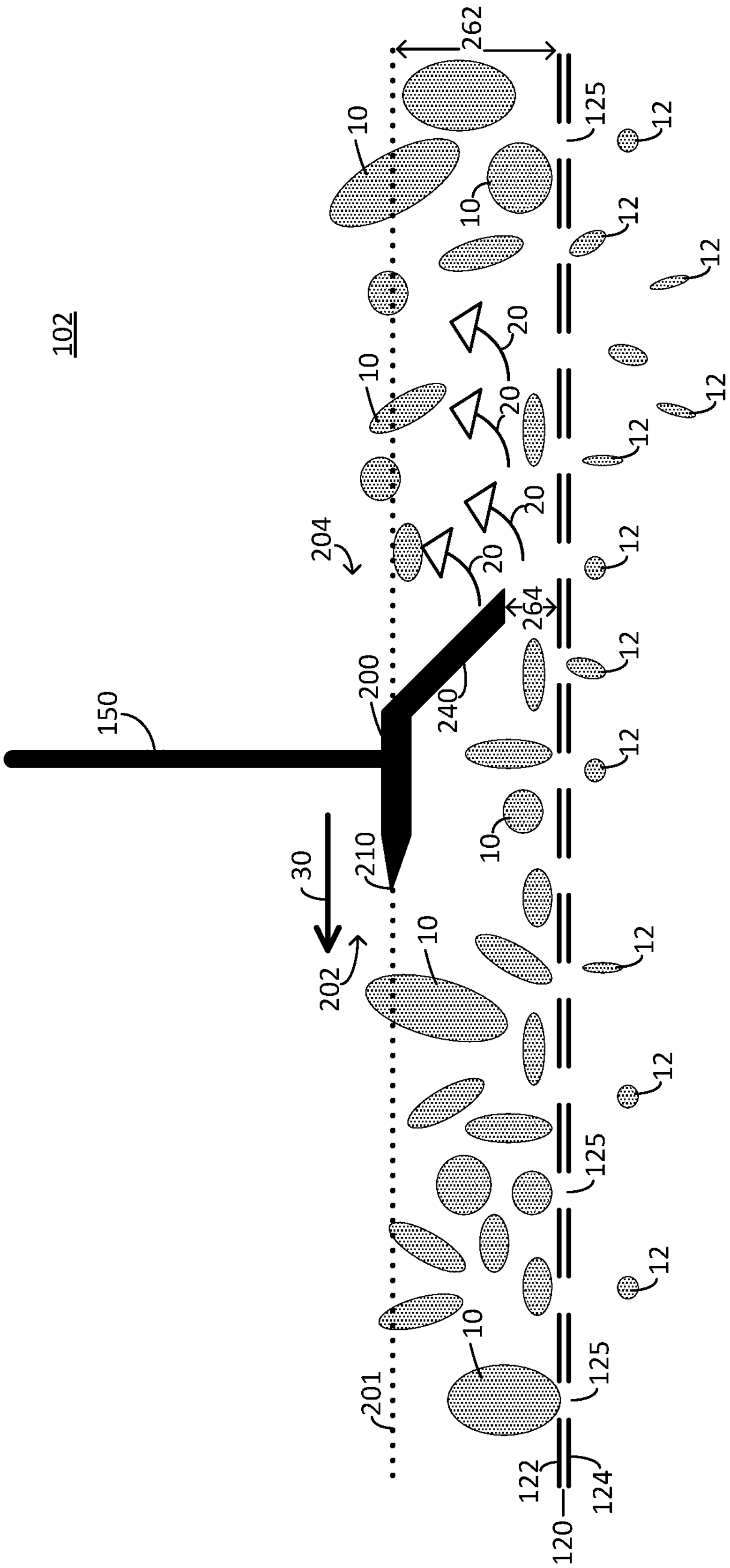
FIG. 6 is a schematic elevation view of a screen and rotating blade of the apparatus of FIG. 1, with botanical feedstock being swept up as the blade is rotated.

As exemplified in FIG. 6, blade 200 has a leading side 202 that precedes a trailing side 204 when blade 200 is rotated in its forward direction of rotation 30. A cutting edge 210 is provided along at least a portion of, and preferably along most or substantially all of, the leading side 202, so that botanical feedstock impacted by the blade will be cut or otherwise reduced in size. Cutting edge 210 preferably has a sharpened surface 211 positioned at the forward extent of leading side 202, such that when blade 200 is rotated in its forward direction of rotation, cutting edge 210 will likely be the initial point of contact between blade 200 and botanical feedstock positioned in the path of blade 200.

In the illustrated example, cutting edge 210 is formed on separate cutting edge insert 215 that is mechanically fastened to a main body portion 250 of blade 200 using bolts inserted through apertures 216 in cutting edge insert 215 and apertures 218 in main body portion 250. Alternatively, cutting edge insert 215 may be secured to blade 200 in another suitable manner, such as by welding or through the use of an adhesive.

Alternatively, cutting edge 210 may be formed by sharpening, grinding, or otherwise machining the leading side of main body portion 250 of blade 200.

As exemplified in FIG. 2, cutting edge 210 of blade 200 may extend to or proximate to the inner surface of the sidewall of vessel 100. An advantage of this design is that feedstock may be inhibited of falling down the sidewall of the vessel to the upper surface of screen 120. Therefore the radial length 219 (see FIG. 3) of blade 200 may be based on the diameter of vessel 100. For example, the radial length 219 may be equal to the radius of vessel 100 less an allowance for the hub to which blade 200 is attached and less an amount to position the radial outer end of blade 200 spaced from the inner surface of the sidewall of vessel 100. As exemplified, vessel 100 has a diameter of 22 inches and a radial length 219 of about 8.5 inches, although the cutting edge may be longer or shorter in alternative embodiments. Also, cutting edge insert 215 may have a width 217 in the direction of rotation of about 0.87 inches, although the insert 215 may be wider or narrower in alternative embodiments.

Blade 200 also has a downwardly extending trailing portion 240 provided along at least a portion of, and preferably along most or substantially all of or all of, the trailing side 204. When blade 200 is rotated in its forward direction of rotation, downwardly extending trailing portion 240 may generate air turbulence (e.g. localized areas of lower pressure) sufficient to impart an upward force on botanical feedstock positioned on or above screen 120. For example, downwardly extending trailing portion 240 may be configured to produce eddy currents that draw cut and partially cut feedstock upwardly towards a plane of rotation of the cutting edge 210 of blade 200.

Preferably, downwardly extending trailing portion 240 has a plurality of discontinuities along a radial length of the trailing portion. In the example illustrated in FIGS. 4 and 5, the lower edge 244 of downwardly extending trailing portion 240 is generally saw toothed in shape, with four triangular notches 245 provided along the lower edge 244. In alternative embodiments, more or fewer notches may be provided. Also, the discontinuities need not be triangular notches, and lower edge 244 may have any other suitable shape or profile. For example, lower edge 244 may have a profile that is generally sinusoidal in shape.

By providing downwardly extending trailing portion 240 at an angle to the direction of rotation of blade 200, as the blade is rotated energy imparted to the air can be characterized as a downward 'pushing' force. Further, as the downwardly extending trailing portion 240 has a plurality of discontinuities (e.g. a saw toothed or sinusoidal profile), as the blade 200 is rotated the discontinuities generate alternating regions of higher pressure (proximate the lowermost edge or 'peaks' of the discontinuities) which may be characterized as 'higher compression areas', and of lower pressure (proximate the uppermost edge or 'troughs' of the discontinuities) which may be characterized as 'lower compression areas'. An effect of these alternating pressure regions is that botanical feedstock positioned between blade 200 and screen 120 may be entrained or 'swept up' and directed upwardly as air is forced from the higher compression areas towards the lower compression areas.

For example, as shown schematically in FIG. 6, as blade 200 is rotated so that the leading side 202 precedes trailing side 204, botanical feedstock 10 positioned in the rotational plane 201 of cutting edge 210 may be impacted (and cut) by the cutting edge, while botanical feedstock 10 positioned above screen 120 and entirely below the plane 201 of cutting edge 210 may not be impacted by the cutting edge. However, as blade 200 is rotated, air turbulence or a lifting force 20 generated by downwardly extending trailing portion 240 may impart upward movement on at least some botanical feedstock particles 10 positioned above screen 120 that were below the plane 201 of cutting edge 210, such they move to a position in or above the plane 201 of cutting edge 210 and may therefore be impacted (and cut) by subsequent rotations of blade 200 (or, if more than one blade is provided, by another blade 200). Comminuted feedstock particles 12 may pass through apertures 125 in screen 120 and be directed towards feedstock outlet 114 by gravity and/or an induced air flow (as discussed further below).

In the illustrated example, the depth and width of each notch is similar, with each notch 245 having a depth 221, a width 224, and a notch angle 225. For example, each notch 245 may have a depth 221 of about 0.63 inches, a width 224 of about 1.26 inches, and a notch angle 225 of about 90 degrees. In alternative embodiments, downwardly extending trailing portion 240 may have notches with dissimilar depths, widths, and/or notch angles.

Preferably, downwardly extending trailing portion 240 extends at an angle 230 of between 120° and 150° to the plane of rotation of cutting edge 210.

In the illustrated example, downwardly extending trailing portion 240 extends at an angle 230 of about 135°.

Downwardly extending trailing portion 240 may be secured to blade 200 in any suitable manner. For example, a main body portion 250 and downwardly extending trailing portion 240 may be cut or otherwise formed as a flat sheet and subsequently bent at fold line 241 to form angle 230. Main body portion 250 may then be mechanically fastened, welded, or otherwise secured to a separately formed cutting edge 210 to form blade 200. In alternative embodiments, downwardly extending trailing portion 240 may be formed separately and mechanically fastened, welded, or otherwise secured to blade 200.

In the illustrated example, main body portion 250 has a radial length 220 of about 8 inches, although main body portion 250 may be longer or shorter in alternative embodiments. Also, main body portion 250 has a width 222 of about 1.97 inches prior to folding (see FIG. 3), although main body portion 250 may be wider or narrower in alternative embodiments.

Figure 4:
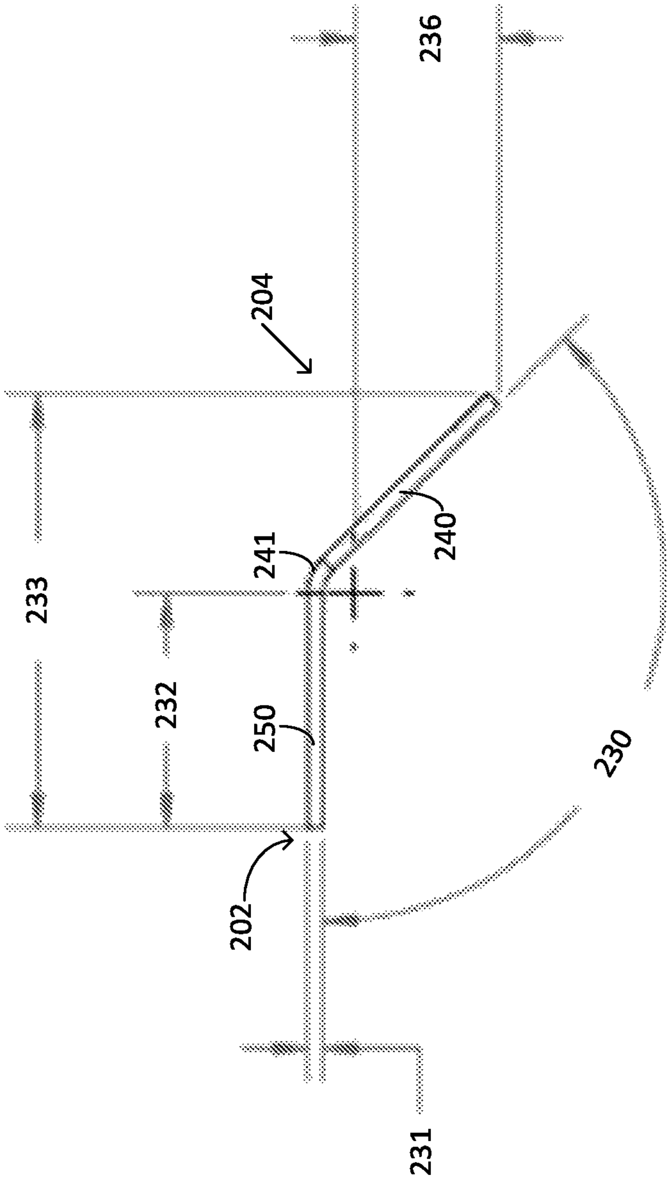
FIG. 4 is a radial section view of the main blade body of FIG. 3 after bending to create the downwardly extending trailing portion.
Figure 5:
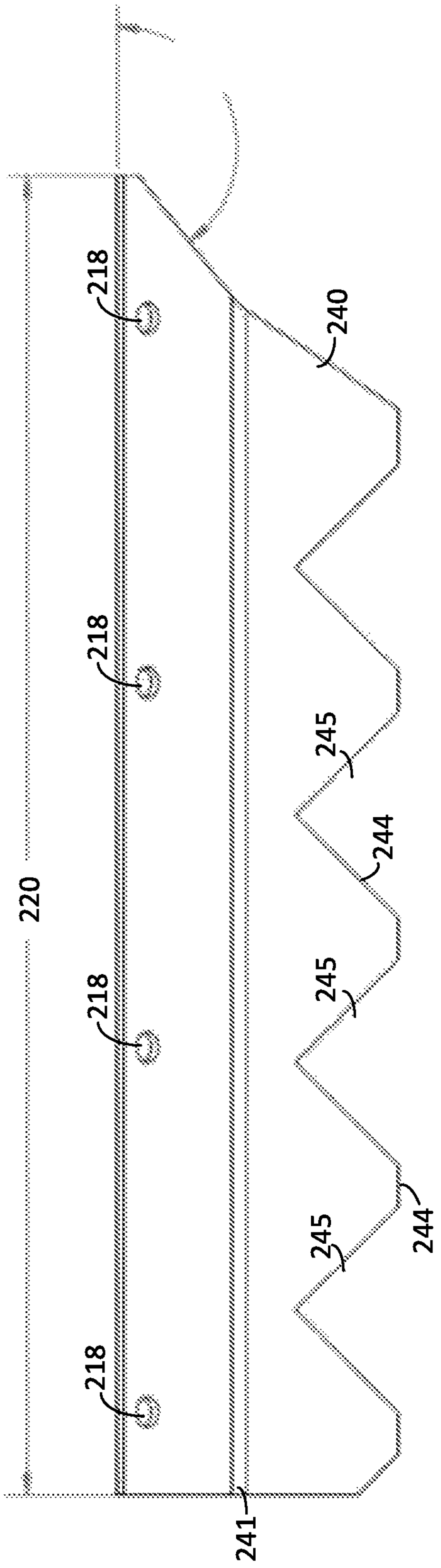
FIG. 5 is a top view of the main blade body and downwardly extending trailing portion of FIG. 4.

After folding, (e.g. as shown in FIG. 4), main body portion 250 has an overall width 233, which may be about 1.71 inches, or wider or narrower in alternative embodiments. Also, downwardly extending trailing portion 240 may have a height 236 of about 0.56 inches.

Also, in the illustrated example main body portion 250 has a thickness 231 of about 0.06 inches (e.g. it may be cut from a sheet of 16 gauge SAE 304 stainless steel), although main body portion 250 may be thicker or thinner in alternative embodiments.

As exemplified in FIG. 6, blade 200 is mounted above screen 120. In this arrangement, cutting edge 210 is spaced from screen 120 by a first distance 262. Preferably, distance 262 is from about 31 mm to about 54 mm. In a preferred embodiment, distance 262 is about 24 mm.

Also, the lowermost portion of lower edge 244 of downwardly extending trailing portion 240 is spaced from screen 120 by a second distance 264. Preferably, distance 264 is from about 7 mm to about 30 mm. In a preferred embodiment, distance 264 is about 20 mm.

An advantage of this spacing is that it may reduce crushing and/or shearing of botanical feedstock by the downwardly extending trailing portion 240 as the blade is rotated. Alternatively, or additionally, it may reduce frictional heat generated in and/or transferred to botanical feedstock during comminution. For some feedstocks (e.g. cannabis), this may be particularly desirable, as one or more components of the feedstock may be susceptible to thermal degradation and/or volatilization (e.g. aliphatic aldehydes (nerol, geraniol, octanal, decanal), and/or monoterpenes (limonene, pinenes, ocimenes)).

Feedstock outlet in communication with a source of negative pressure

The flowing is a description of the use of negative pressure which may be used by itself or in combination with one or more of the other features disclosed herein including the configuration of the cutting blades, the use of one or more cyclone separators and any of the methods disclosed herein.

In accordance with this aspect, feedstock outlet 114 is coupled to a conduit or otherwise in fluid communication with a source of negative pressure.

In accordance with this aspect, the source of negative pressure may be used to reduce the air pressure within vessel 100 to below ambient. Reducing the air pressure within the vessel may have a number of advantages. For example, pieces of cut and partially cut feedstock—including dust and other fine particulate matter generated during comminution—may be drawn through the screen and towards and through feedstock outlet 114, which may increase the collection efficiency of the comminution apparatus. Additionally, reducing the air pressure within the vessel may reduce or minimize any loss of fine particulate matter (e.g. trichomes, terpenes) during comminution. For example, dust and other fine particulate matter may be inhibited from collecting on interior surfaces of vessel 100. Additionally, or alternatively, dust and other fine particulate matter may be inhibited from exiting vessel 100 through feed port 113 of In addition, comminuted feedstock may be drawn to downstream equipment for, e.g., separation or further processing, without mechanically contacting the feedstock.

Another advantage of feedstock outlet 114 being in fluid communication with a source of negative pressure is that botanical feedstock (including pieces of cut and partially cut feedstock) may be drawn downwardly towards the cutting zone or the screen 120.

It will be appreciated that if the blades are configured to cause the feedstock to rise upwardly from the screen into the cutting zone, then trailing portion 240 of the rotating blade may be configured to impart an upward force on botanical feedstock positioned between blade 200 and screen 120 sufficient to overcome the negative pressure and cause the feedstock to rise.

Directing botanical feedstock towards the rotating blade 200 may improve the efficiency and/or throughput of the comminution apparatus. For example, the apparatus may be able to process a greater amount of botanical feedstock per unit time. Also, the apparatus may be able to process a given volume of botanical feedstock in less time, which may be particularly desirable for some feedstocks (e.g. cannabis), one or more components of the feedstock (e.g. aliphatic aldehydes, monoterpenes) may be susceptible to thermal degradation.

Figure 7:
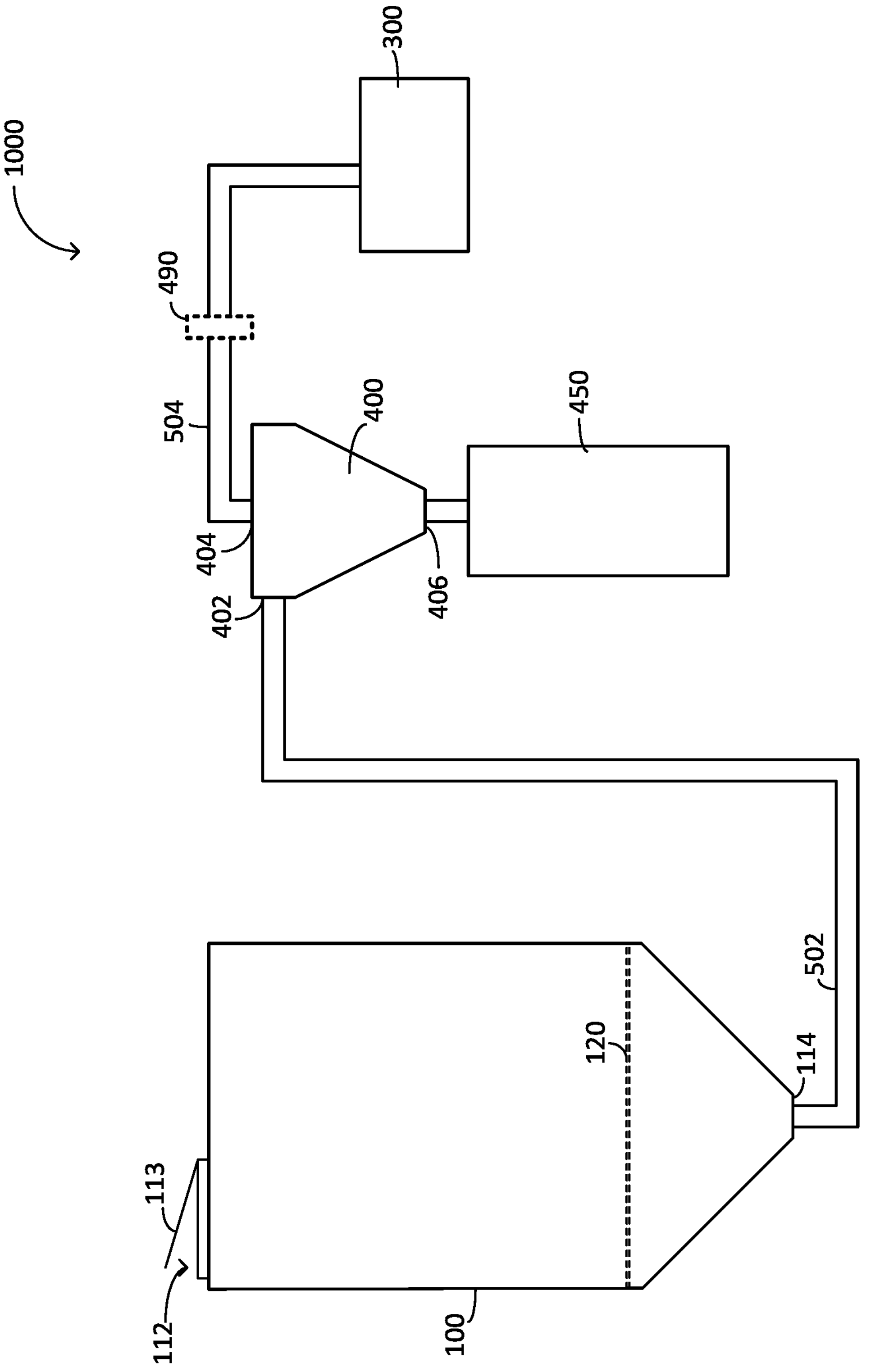
FIG. 7 is a schematic view of an apparatus for the treatment of cannabis or other botanical feedstock in accordance with another embodiment, including a source of negative pressure, a cyclonic separator, and an optional physical filtration member.

Referring to FIG. 7, an apparatus for comminution of a botanical feedstock 1000 is shown with a feedstock outlet 114 in fluid communication with a source of negative pressure 300. In the illustrated example, a separation member 400 is positioned downstream of feedstock outlet 114 and upstream of the source of negative pressure 300. As discussed further below, in the illustrated example separation member 400 is a cyclonic separator. The separation member may be any separation member which uses changes in the direction of flow of air (e.g., a momentum separator) or changes in an air flow pattern or speed (e.g., a cyclone separator) or the like to disentrain feedstock from an air stream.

In the illustrated example, a conduit 502 extends between feedstock outlet 114 and a fluid inlet 402 of separation member 400, and a conduit 504 extends between a fluid outlet 404 of separation member 400 and the source of negative pressure 300. It will be appreciated that any suitable conduit may be used, such as a flexible plastic conduit, a rigid plastic conduit, a rigid metal conduit, and the like.

The source of negative pressure may comprise any suitable device or apparatus capable of inducing a fluid flow out of feedstock outlet 114. For example, the source of negative pressure 300 may comprise a powered airflow fan capable of inducing an airflow from an air inlet of the source of negative pressure 300 to an air outlet of the source of negative pressure 300. In such an example, by placing the air inlet of the source of negative pressure 300 in fluid communication with feedstock outlet 114, the source of negative pressure 300 may thereby induce an airflow out of vessel 100, thereby reducing the pressure within vessel below ambient.

In some embodiments, the negative pressure may be from 15 to 29 inHg, 20 to 27 inHg, or 22 to 25 inHg.

Feedstock Outlet in Communication with a Cyclonic Separator

The flowing is a description of the use of one or more cyclone separators which may be used by itself or in combination with one or more of the other features disclosed herein including the configuration of the cutting blades, having the feedstock outlet in communication with a source of negative pressure and any of the methods disclosed herein.

In accordance with this aspect, one or more cyclone separators may be provided to separate the feedstock from the air stream.

Another advantage of this aspect is that botanical feedstock (including pieces of cut and partially cut feedstock and dust) may be separated from an air stream used to convey the feedstock from the vessel 100 without further damage to the feedstock. A further advantage is that more than one cyclonic separator may be positioned in series in the fluid flow path between the feedstock outlet of the vessel and the source of negative pressure. Each such cyclone separator may be configured to remove different sized particulate matter. For example, a first stage cyclonic separator may be configured to remove larger or heavier portions of the feedstock and a downstream second stage cyclonic separator may be configured to remove lighter or finer portions of the feedstock. Accordingly, the cyclonic separators may be used to produce treated feedstocks having different particle size profiles.

In the example illustrated in FIG. 7, the source of negative pressure 300 induces fluid flow from the vessel 100, into and through the cyclonic separator 400. Cyclonic separator 400 may be of any design. As air travels in the cyclonic separator 400, particulate matter is separated and an air stream having a reduced level of particulate matter exits the cyclonic separator 400 via a cyclonic separator air outlet. The separated particulate matter may exit the cyclonic separator 400 via a comminuted particle outlet 406.

As exemplified in FIG. 7, a separated material collection chamber 450 is shown in communication with the comminuted particle outlet 406 of cyclonic separator 400 to receive particles of comminuted botanical feedstock (e.g. particles of comminuted cannabis) dis-entrained from a fluid stream (e.g. an air stream) entering fluid inlet 402 of the cyclonic separator 400.

Preferably, the separated material collection chamber 450 is removable from the cyclonic separator 400. Providing a detachable separated material collection chamber 450 may allow a user to transport (e.g. carry) the collected comminuted feedstock (e.g. comminuted cannabis) to another location for emptying and/or further processing, without needing to carry or move the cyclonic separator 400. Preferably, the separated material collection chamber 450 is removable as a closed module, which may help prevent the comminuted feedstock from spilling out of the separated material collection chamber 450 during transport.

Alternately, comminuted particle outlet 406 may be in flow communication with a conduit which transports the separated particulate matter to, e.g., another piece of equipment for further processing.

Optionally, an additional filter may be provided downstream of cyclonic separator 400. The additional filter may remove particulate matter from the airstream exiting the cyclonic separator 400 that was not removed from the incoming airstream to the cyclonic separator 400. For example, as illustrated in FIG. 7, a physical or electrostatic filtration member 490 may be provided downstream of the cyclonic separator 400 and upstream of the source of negative pressure 300. Filtration member 490 may incorporate a bag, a porous physical filter media (such as foam or felt), or other physical air treating means.

It will be appreciated that two or more cyclonic separation stages may be used, each of which uses one or more cyclonic separators 400. The cyclonic separators 400 of each stage may be the same or different. The cyclonic separators 400 of one stage may be different to the cyclonic separators of another stage, although in some embodiments, they may be the same. As exemplified in FIG. 8, a second cyclonic separator 400*b* is provided downstream of a first cyclonic separator 400*a*. A second separated material collection chamber 450*b* is shown in communication with a comminuted particle outlet 406*b* of second cyclonic separator 400*b* to receive particles of comminuted botanical feedstock (e.g. particles of comminuted cannabis) dis-entrained from the fluid stream exiting the first cyclonic separator 400*a*.

For example, the fluid stream that exits first cyclonic separator 400*a* via fluid outlet 404*a* and that is conveyed to fluid inlet 402*b* of second cyclonic separator 400*b* by conduit 506 has a reduced level of comminuted feedstock relative to the fluid stream entering the first cyclonic separator 400*a* via inlet 402*a*, due the separation of comminuted botanical feedstock (e.g. particles of comminuted cannabis) by first cyclonic separator 400*a*, with the separated particles being collected in separated material collection chamber 450. Also, the fluid stream exiting second cyclonic separator 400*b* via conduit 504 has a further reduced level of comminuted feedstock relative to the fluid stream entering the second cyclonic separator 400*b* via fluid inlet 402*b*, due the separation of comminuted botanical feedstock (e.g. particles of comminuted cannabis) by second cyclonic separator 400*b*, with the separated particles being collected in second separated material collection chamber 450*b*.

Preferably, feedstock particles separated by the second cyclonic separator 400*b* and collected in second separated material collection chamber 450*b* have a smaller average particle size than feedstock particles separated by the first cyclonic separator 400*a* and collected in separated material collection chamber 450*a*. This may be achieved by, for example, providing a second cyclonic separator having a cyclone chamber with a smaller radius than the cyclone chamber of the first cyclonic separator 400*a*. In such a case, particles entrained in the airflow in the second cyclonic separator 400*b* will experience a greater centrifugal force than they experienced in the first cyclonic separator 400*a*, which may promote the dis-entrainment of smaller particles from the airflow in the second cyclonic separator 400*b*. Advantageously, collecting finer particles may reduce or eliminate the loss of structures (e.g. trichomes) that contain one or more compounds of interest.

Separating (and collecting) comminuted feedstock particles having different average particle sizes may have one or more advantages. For example, for cannabis, the smaller particles separated and using second cyclonic separator may include a greater proportion of trichomes that have been detached from the plant material fed into the grinder 1000. These trichomes contain resin with a relatively high concentration of certain compounds (e.g. cannabinoids) that are typically considered valuable. Accordingly, particles collected in second separated material collection chamber 450*b* may have a relatively higher concentration of these compounds than particles collected in first separated material collection chamber 450*a*. Separating and collecting particles with different relative cannabinoid concentrations may improve e.g. the efficiency of subsequent processing steps (e.g. compound extraction). Alternatively, or additionally, particles with a larger average particle size (e.g. those separated by first cyclonic separator 400*a*) may be used for a first type of further processing (e.g. to produce a 'hashish'-type product of compressed trichomes) and particles with a smaller average particle size (e.g. those separated by second cyclonic separator 400*b*) may be used for a second type of further processing (e.g. a solvent extraction).

General Description of Method of Operating an Apparatus for the Comminution of a Botanical Feedstock The flowing is a description of a method of operation which may be used by itself or in combination with one or more of the other features disclosed herein including the configuration of the cutting blades, having the feedstock outlet in communication with a source of negative pressure, the use of one or more cyclone separators and any of the methods disclosed herein.

Figure 9:
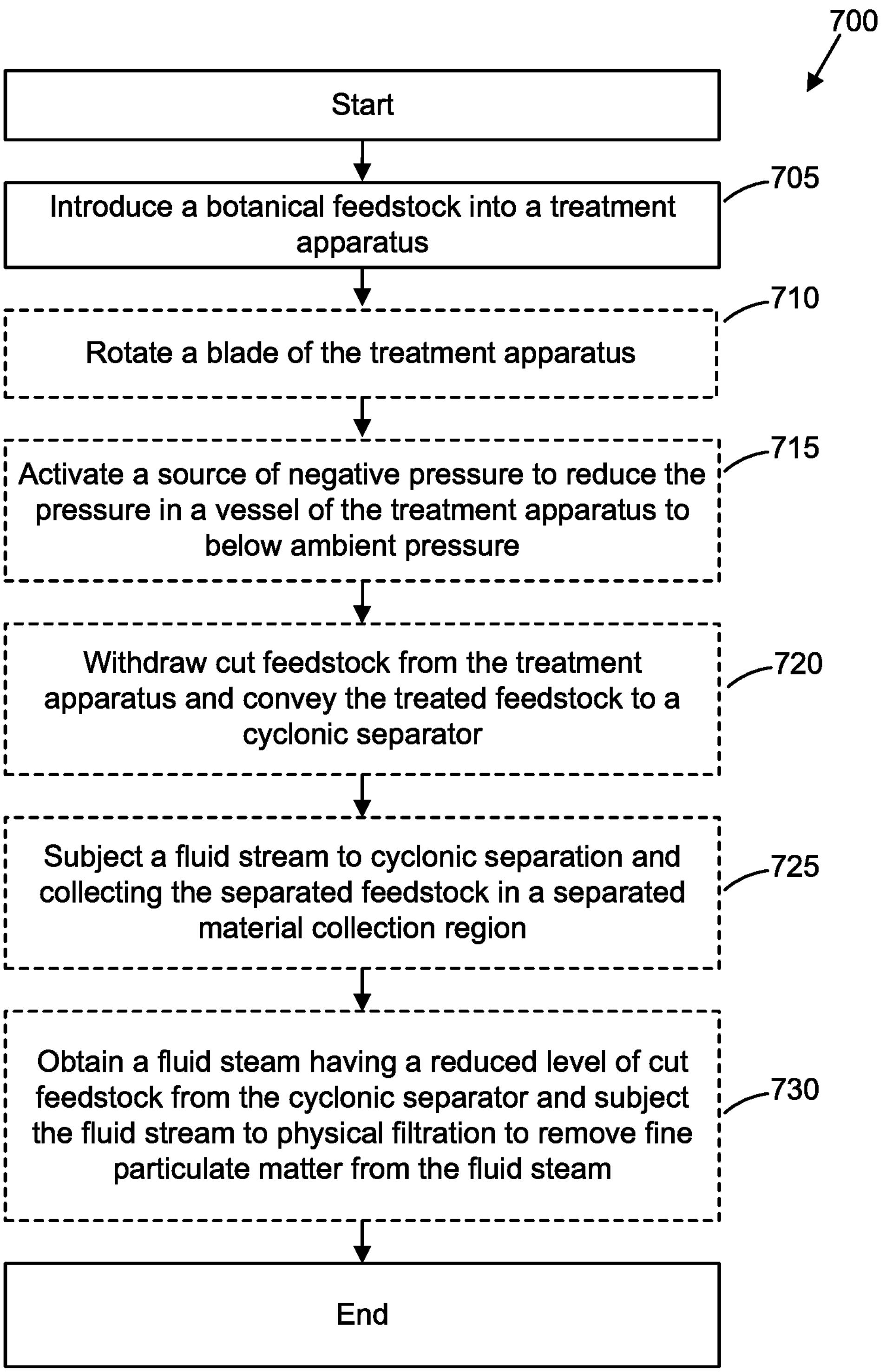
FIG. 9 is a simplified process flow diagram for a method of operating an apparatus for the comminution of a botanical feedstock in accordance with one embodiment.

Referring to FIG. 9, there is illustrated a method 700 for operating an apparatus for the comminution of a botanical feedstock, the apparatus having a vessel, a first feedstock outlet connected in fluid communication with a source of negative pressure, and a screen positioned above the first feedstock outlet. Also, the apparatus has a blade rotatably mounted above the screen and configured to be rotated in a direction of rotation, where at least a portion of a leading side of the blade has a cutting edge, and at least a portion of a trailing side of the blade has a downwardly extending trailing portion with a lower edge having a plurality of discontinuities. Method 700 may be used to operate apparatus 1000 or any other suitable apparatus for the comminution of a botanical feedstock.

At 705, a botanical feedstock is introduced into the treatment apparatus. For example, cannabis may be fed into vessel 100 through a feedstock inlet 112 provided at the upper end 102 of vessel 100.

At 710, the blade of the apparatus is rotated at a rate of rotation in order to cut the botanical feedstock. Also, at the rate of rotation, the trailing portion generates turbulence that induces upward movement of cut and partially cut feedstock from an upper surface of the screen to a plane of rotation of the cutting edge of the blade. For example, the blade may be rotated from between about 750 rotations per minute (RPM) to about 1400 RPM (measured at the drive shaft of the blade), and preferably at about 900 RPM. Generally speaking, at higher rates of rotation the turbulence generated by the rotating blade is greater, which may cause cut and partially cut feedstock to be raised into the path of the cutting edge more frequently, which may improve the efficiency and/or rate of reduction in the size of the feedstock.

Optionally, at 715, the source of negative pressure is activated to reduce the pressure in the vessel to below ambient pressure. Activation of the source of negative pressure also results in a downward force being applied to the cut and partially cut feedstock, as air is drawn towards the feedstock outlet. However, at the rate of rotation, the turbulence generated by the rotation of the blade overcomes the downward force, resulting in upward movement of cut and partially cut feedstock to the plane of rotation of the cutting edge of the blade.

For example, the lower edge of the downwardly extending trailing portion of the blade may be generally saw toothed in shape, and at the rate of rotation, the rotation of the blade may provide lift to the cut and partially cut feedstock.

Additionally, or alternatively, by rotating the blade at the rate of rotation, the plurality of discontinuities may produce eddy currents that draw cut and partially cut feedstock upwardly to a plane of rotation of the cutting edge of the blade.

Put another way, the blade may be rotated at a rate of rotation sufficient to effectively 'neutralize' a downward force on the cut and partially cut feedstock that is produced by the negative pressure in the vessel, and provide lift so that the feedstock moves upwardly to a zone in which it is cut or further cut.

As noted above, at the rate of rotation, the trailing portion may generate turbulence that induces upward movement of cut and partially cut feedstock from an upper surface of the screen to a plane of rotation of the cutting edge of the blade. However, as illustrated schematically in FIG. 6, despite the induction of upward movement of at least some cut and partially cut feedstock 10 from an upper surface of the screen, the source of negative pressure may nevertheless draw fine particulate matter (e.g. cut or otherwise comminuted feedstock particles 12) through the screen and towards a feedstock outlet of the vessel.

Using the source of negative pressure to draw fine particulate matter through the screen may have one or more advantages. For example, inducing or encouraging fine particulate matter towards a feedstock outlet may increase the collection efficiency of the comminution process. Additionally, it may reduce or minimize any loss of fine particulate matter (e.g. trichomes, terpenes) during comminution.

For example, particles of feedstock that have been cut or otherwise reduced to a size that allows them to pass through apertures of the screen may be encouraged to pass through the screen by the airflow generated by the source of negative pressure. For example, the negative pressure may be sufficient to draw at least 75% of the fine particulate matter from a volume defined above the blade and through the screen. Advantageously, this may reduce or minimize any loss of fine particulate matter (e.g. trichomes, terpenes) during comminution. For example, dust and other fine particulate matter may be inhibited from collecting interior surfaces of vessel 100, and/or be inhibited from exiting vessel 100 through an openable feed port 113 of feedstock inlet 112.

Optionally, at 720, cut feedstock may be withdrawn from the first feedstock outlet and the treated (cut) feedstock may be conveyed to a cyclonic separator 400. For example, a cyclonic separator 400 may be provided downstream of the first feedstock outlet and upstream of the source of negative pressure.

Optionally, at 725, the fluid stream drawn from the vessel through the first feedstock outlet may be subjected to cyclonic separation. During cyclonic separation, cut feedstock (e.g. particles of comminuted cannabis) entrained in the fluid stream is separated from the fluid stream, and the separated feedstock is collected in a separated material collection region.

Optionally, the cyclonic separation may consist of a single cyclonic separation stage, e.g. a single cyclone chamber, or two or more cyclone chambers arranged in parallel. Alternatively, a second cyclonic separation stage may be provided in series with (downstream of) the first cyclonic separation stage.

During cyclonic separation, at least some, preferably most, and most preferably substantially all of the cut feedstock entrained in the fluid stream is separated from the fluid stream. Where not all of the cut feedstock is dis-entrained from the fluid stream by the cyclonic separator, fluid exiting the cyclonic separator will still contain at least some entrained cut feedstock. Optionally, at 730, a fluid steam having a reduced level of cut feedstock obtained from the cyclonic separator is subjected to further filtration to remove fine particulate matter from the fluid steam having a reduced level of cut feedstock. This further filtration may be a physical filter media to reduce the particulate level to a level suitable for introduction to the ambient.

General Description of Method of Operating Continuously Operating a Batch Grinder The flowing is a description of a method of operation which may be used by itself or in combination with one or more of the other features disclosed herein including the configuration of the cutting blades, having the feedstock outlet in communication with a source of negative pressure, the use of one or more cyclone separators and any of the methods disclosed herein.

Typically, a batch grinder may be loaded with a first quantity of material to be ground or otherwise comminuted (e.g. a botanical feedstock such as cannabis) through an inlet port that is closed after the material is loaded. Once loaded, the grinder is operated until all or substantially all of the loaded material is ground. The grinder is then de-activated to allow a second quantity or 'batch' of material to be ground, and optionally for the ground material from the first batch to be removed.

Figure 10:
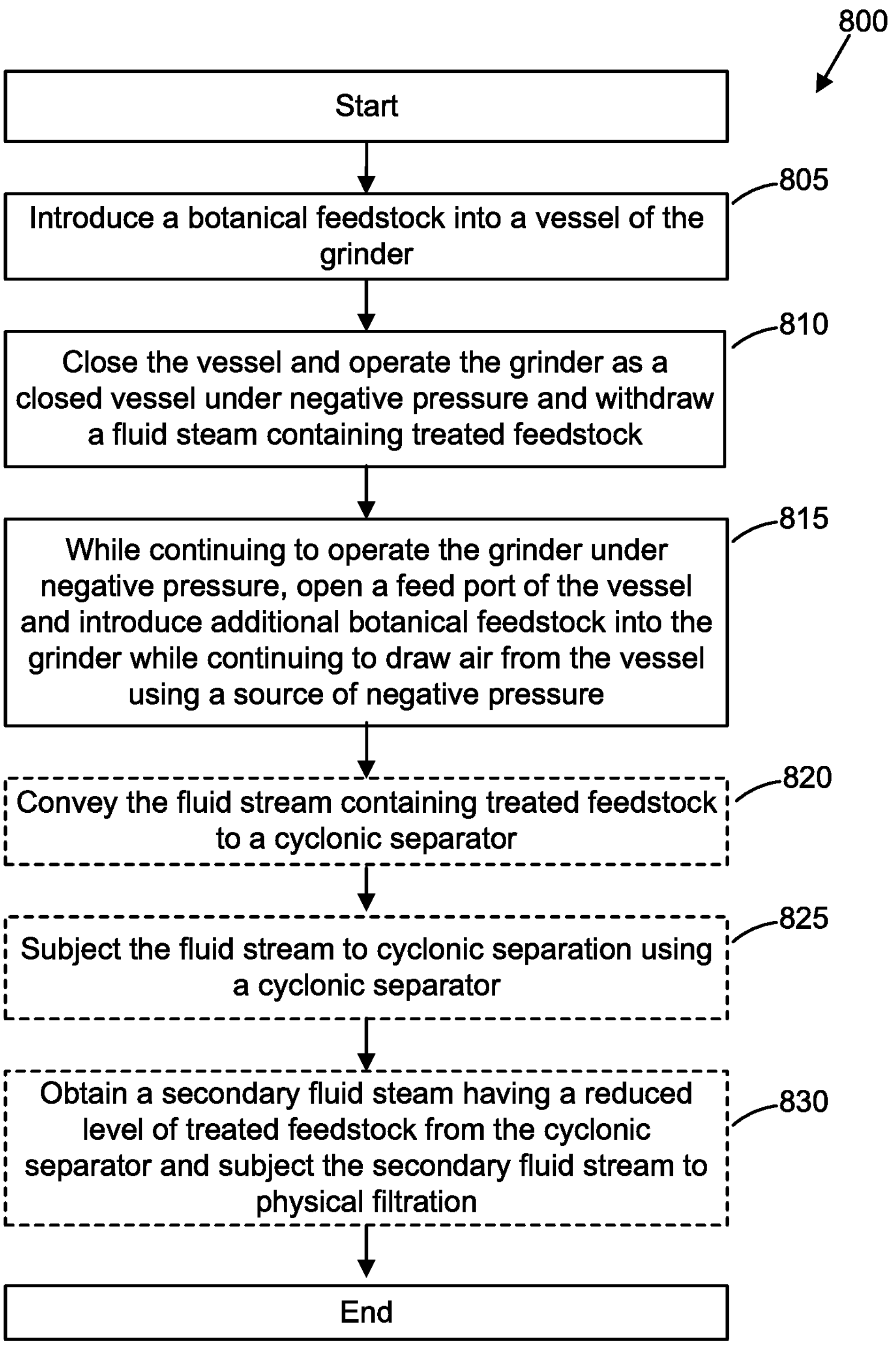
FIG. 10 is a simplified process flow diagram for a method of continuously operating a batch grinder in accordance with one embodiment.

Referring to FIG. 10, there is illustrated a method 800 for continuously operating a batch grinder. Method 800 may be used to operate grinder 1000 or any other suitable botanical feedstock grinder.

At 805, a botanical feedstock is introduced into a vessel of the grinder. For example, cannabis may be fed into vessel 100 through a feedstock inlet 112 provided at the upper end 102 of vessel 100.

At 810, the vessel is closed and the grinder is operated as a closed vessel under negative pressure. While the grinder is operational, a fluid steam containing treated (e.g. comminuted) feedstock is withdrawn from the grinder. For example, a source of negative pressure in fluid communication with a feedstock outlet may draw particles of feedstock that have been cut or otherwise reduced in size by the grinder through a feedstock outlet of the grinder. It will be appreciated that the grinder may be any apparatus suitable for comminuting the feedstock.

At 815, while continuing to operate the grinder under negative pressure, a feed port of the vessel may be opened and additional botanical feedstock may be introduced into the grinder via the feed port while continuing to draw air from the vessel using a source of negative pressure. Since air is being continuously drawn from the vessel, particles of ground (or unground) feedstock may be inhibited or prevented from exiting the grinder via the feed port. Accordingly, valuable feedstock may not be lost to the ambient while fresh feedstock is added to the grinder with the grinder operating.

Optionally, at 820, the fluid stream drawn from the vessel may be conveyed to a cyclonic separator. For example, a cyclonic separator may be provided downstream of a feedstock outlet of the grinder and upstream of the source of negative pressure.

Optionally, at 825, the fluid stream drawn from the vessel may be subjected to cyclonic separation. During cyclonic separation, cut feedstock (e.g. particles of comminuted cannabis) entrained in the fluid stream is separated from the fluid stream, and the separated feedstock is collected in a separated material collection region. Optionally, the cyclonic separation may consist of a single cyclonic separation stage, e.g. a single cyclone chamber, or two or more cyclone chambers arranged in parallel. Alternatively, a second cyclonic separation stage may be provided in series with the first cyclonic separation stage. Accordingly, a first treated feedstock (e.g., the larger comminuted feedstock) may be collected that is suitable for a particular subsequent treatment operation (e.g., compressed resin glands (hashish)) and a second treated feedstock (e.g., the finer comminuted material) may be collected that is suitable for an alternate subsequent treatment operation (e.g., extraction).

Optionally, at 830, a fluid steam having a reduced level of cut feedstock obtained from the cyclonic separator is subjected to further filtration to remove fine particulate matter from the fluid steam having a reduced level of cut feedstock. This further filtration may be a physical filter media to reduce the particulate level to a level suitable for introduction to the ambient.

General Description of Method for Treating Cannabis

The flowing is a description of a method of operation which may be used by itself or in combination with one or more of the other features disclosed herein including the configuration of the cutting blades, having the feedstock outlet in communication with a source of negative pressure, the use of one or more cyclone separators and any of the methods disclosed herein.

Figure 11:
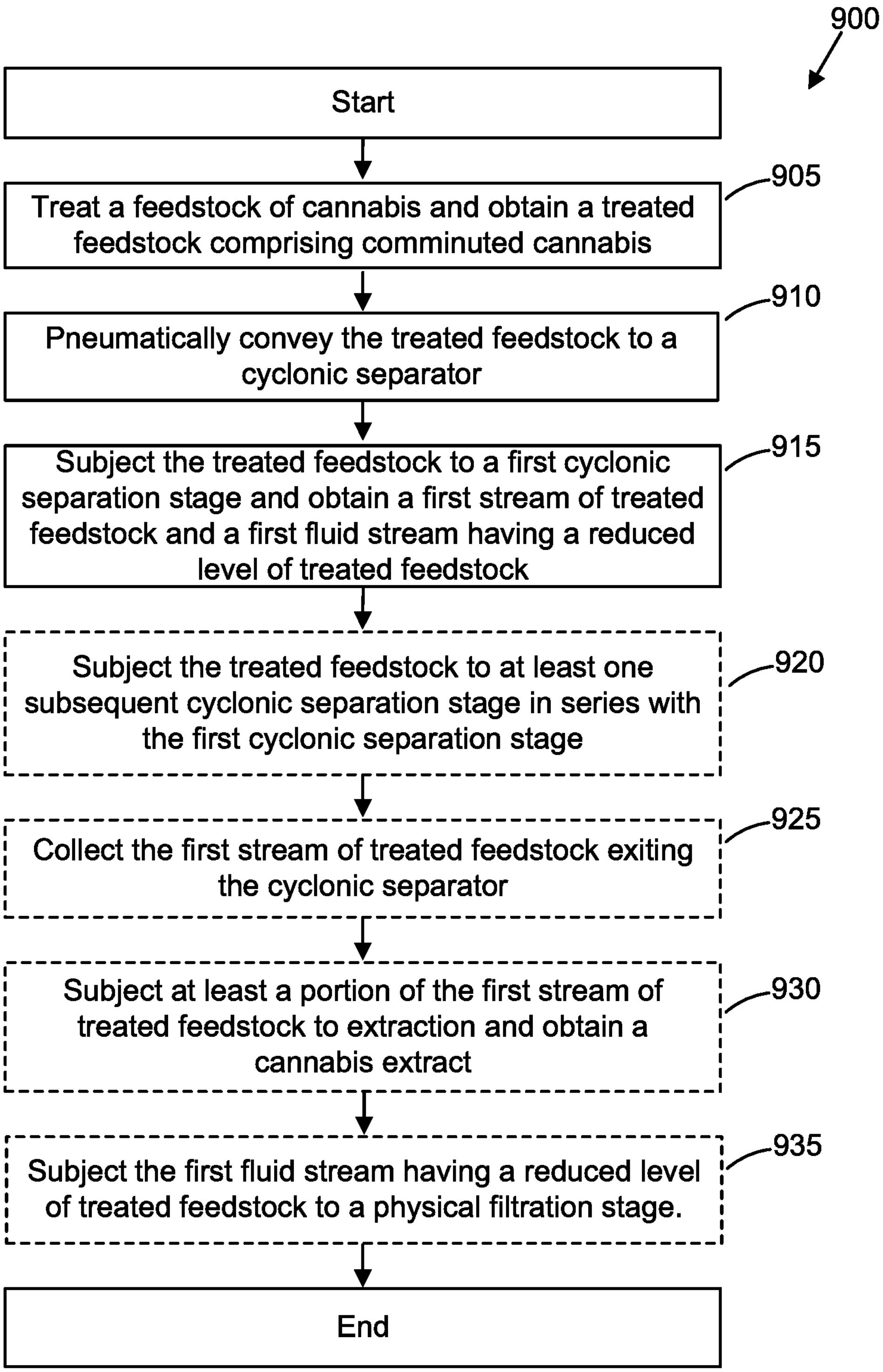
FIG. 11 is a simplified process flow diagram for a method for treating cannabis in accordance with one embodiment.

While the apparatus and methods discussed herein may be suitable for use with a variety of botanical feedstock, they may be particularly well suited for use with a feedstock of cannabis. Referring to FIG. 11, there is illustrated a method 900 for treating cannabis. Method 900 may be used with any apparatus disclosed herein or any other suitable apparatus for treating cannabis.

At 905, a feedstock of cannabis is treated and a treated feedstock comprising comminuted cannabis is obtained. For example, a cannabis feedstock may be comminuted using apparatus 1000.

At 910, the treated feedstock is pneumatically conveyed to a cyclonic separator. For example, a source of negative pressure in fluid communication with a feedstock outlet of apparatus 1000 may draw particles of comminuted cannabis to a cyclonic separator. For example, a cyclonic separator may be provided downstream of a feedstock outlet of the grinder and upstream of the source of negative pressure.

At 915, the air stream drawn from the vessel containing the comminuted cannabis may be subjected to a first cyclonic separation stage. As a result of the cyclonic separation, a first stream of treated feedstock (i.e. particles of comminuted cannabis) separated out of the air stream is obtained, along with a first fluid stream having a reduced level of treated feedstock.

Optionally, at 920, the treated feedstock may be subjected to at least one subsequent cyclonic separation stage in series with the first cyclonic separation stage. Preferably, each subsequent cyclonic separation stage separates treated cannabis having a smaller particle size than the immediately previous cyclonic separation stage.

Additionally, or alternatively, the first fluid stream having a reduced level of treated feedstock may be subjected to a second cyclonic separation stage and a second fluid stream having a further reduced level of treated feedstock and treated feedstock separated out of a fluid stream by the second cyclonic separation stage may be obtained. Preferably, the treated feedstock separated out of a fluid stream by the second cyclonic separation stage has a smaller average particle size than an average particle size of the treated feedstock separated out of a fluid stream by the first cyclonic separation stage.

Optionally, at 925, first stream of treated feedstock exiting the cyclonic separator may be collected. For example, the treated feedstock may be collected in a separated material collection region of the cyclonic separator.

Optionally, at 930, at least a portion of the first stream of treated feedstock may be subjected to extraction to obtain a cannabis extract. For example, treated feedstock collected at 925 may subsequently be subjected to an extraction process (e.g. using a botanical extractor) to obtain a cannabis extract.

Figure 8:
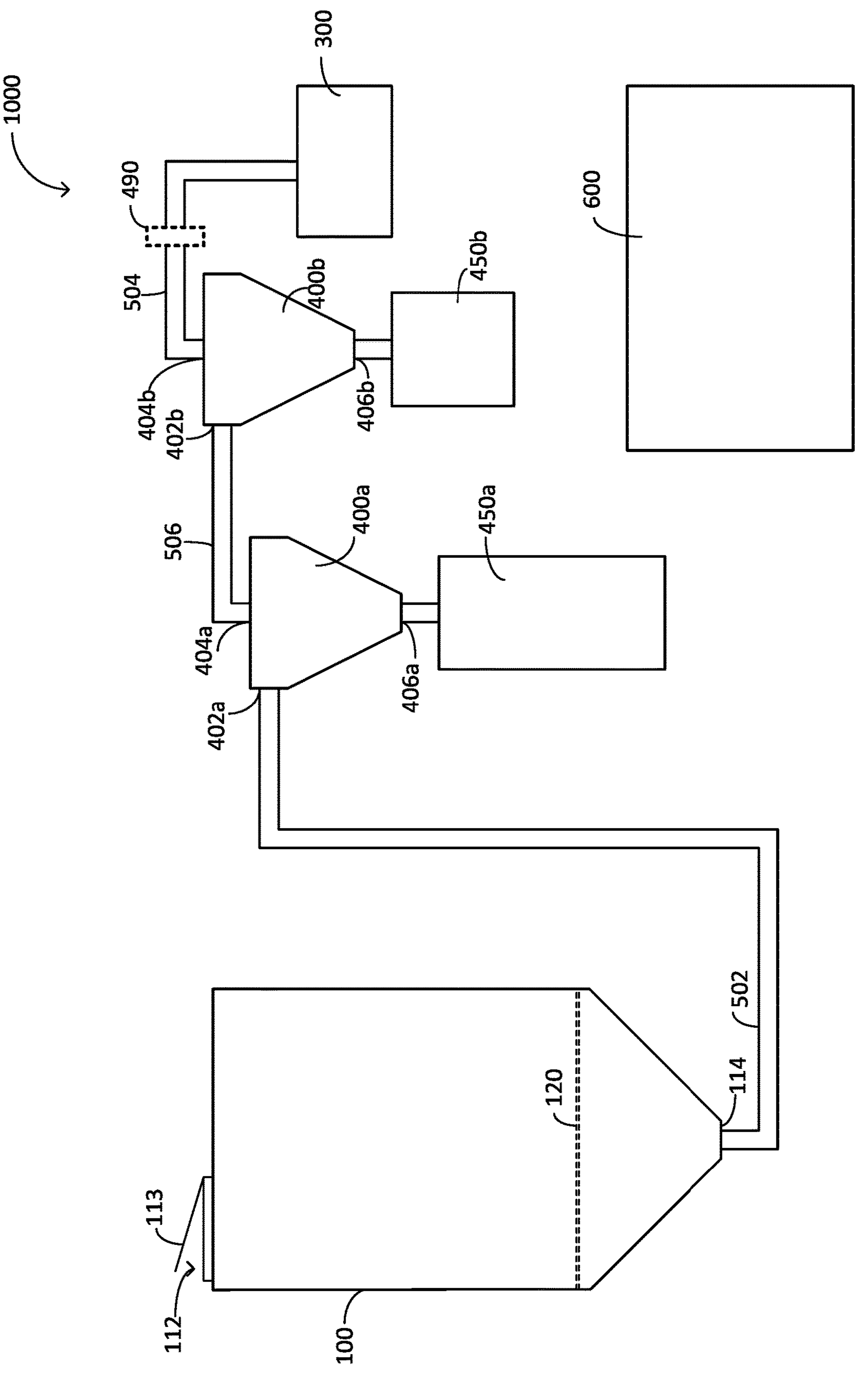
FIG. 8 is a schematic view of an apparatus for the treatment of cannabis or other botanical feedstock in accordance with another embodiment, including a source of negative pressure, and two cyclonic separators arranged in series.

For example, as illustrated in FIG. 8, an extractor 600 may be provided to extract one or more compounds (e.g., waxes, heavy oils, or light oils) from cannabis that has been comminuted using apparatus 1000. In the illustrated example, extractor 600 is separate from the cyclonic separators 400*a*, 400*b*. Accordingly, the treated cannabis collected in one or both separated material collection regions 450*a*, 450*b* may be transferred to the extractor As discussed above, comminuted cannabis collected in chamber 450*b* may be transferred to the extractor, and comminuted cannabis collected in chamber 450*a* may be transferred to another location). For example, where separated material collection chambers 450*a*, 450*b* are detachable from their respective cyclonic separators, a user may transport (e.g. carry) the collected comminuted cannabis in one or both of the detached chambers 450*a*, 450*b* to the extractor 600. Alternatively, an inlet to the extractor may be in communication with a feedstock outlet 406 of a cyclonic separator 400, e.g. using a conduit (not shown), such that cannabis removed from an air stream by the cyclonic separator is transferred directly to the extractor.

Returning to FIG. 11, optionally, at 935, a fluid steam having a reduced level of cut feedstock obtained from the cyclonic separator is subjected to further filtration to remove fine particulate matter from the fluid steam having a reduced level of cut feedstock. This further filtration may be a physical filter media to reduce the particulate level to a level suitable for introduction to the ambient.

As used herein, the wording “and/or” is intended to represent an inclusive—or. That is, “X and/or Y” is intended to mean X or Y or both, for example. As a further example, “X, Y, and/or Z” is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An apparatus for the treatment of cannabis comprising:

(i) a grinder having a feedstock inlet and a feedstock outlet;

(ii) a cyclonic separator positioned downstream from the feedstock outlet, the cyclonic separator having a cyclone inlet receiving comminuted cannabis from the grinder, a comminuted cannabis outlet, and a cyclone air outlet;

(iii) a source of negative pressure downstream from the feedstock outlet of the grinder; and, (iv) an extractor having an inlet that receives at least some of the comminuted cannabis exiting the comminuted cannabis outlet, the extractor producing a cannabis extract.

2. The apparatus of claim 1, wherein the source of negative pressure is downstream from the cyclone air outlet.

3. The apparatus of claim 1, further comprising a separated material collection chamber downstream from the comminuted cannabis outlet.

4. The apparatus of claim 1, wherein the grinder comprises:

(a) a screen positioned in a vessel above the feedstock outlet, the screen having an upper surface and a lower surface; and, (b) a blade rotatably mounted above the screen and rotatable in a direction of rotation, of the blade having a leading edge comprising a cutting portion, wherein the cutting portion is spaced from the upper surface of the screen by a first distance.

5. The apparatus of claim 4, wherein the blade has a trailing edge comprising a downwardly extending trailing portion, the downwardly extending trailing portion having a lower edge having a plurality of discontinuities along a radial length of the trailing portion, wherein a lowermost portion of the lower edge is spaced from the upper surface of the screen by a second distance.

6. The apparatus of claim 1 further comprising a filtration member positioned downstream of the cyclone air outlet.

7. The apparatus of claim 6, wherein the filtration member comprises an additional cyclonic separator.

8. The apparatus of claim 6, wherein the filtration member comprises a physical filtration member.

* * * * *

UNITED STATES PATENT AND TRADEMARK OFFICE

CERTIFICATE OF CORRECTION

PATENT NO. : 10,639,640 B2
APPLICATION NO. : 15/791183
DATED : May 5, 2020
INVENTOR(S) : Nahtigal It is certified that error appears in the above-identified patent and that said Letters Patent is hereby corrected as shown below:

In the Claims

Claim 4, Column 24, Line 7, the term "of the blade having a leading edge comprising a cutting portion" should read "the blade having a leading edge comprising a cutting portion"

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*